US010956759B1

(12) United States Patent
Pertsel et al.

(10) Patent No.: US 10,956,759 B1
(45) Date of Patent: Mar. 23, 2021

(54) AGE DETECTION IN VEHICLES USING COMPUTER VISION

(71) Applicant: Ambarella International LP, Santa Clara, CA (US)

(72) Inventors: Shimon Pertsel, Mountain View, CA (US); Patrick Martin, Rochester, MI (US)

(73) Assignee: Ambarella International LP, Santa Clara, CA (US)

( * ) Notice: Subject to any disclaimer, the term of this patent is extended or adjusted under 35 U.S.C. 154(b) by 275 days.

(21) Appl. No.: 16/033,724

(22) Filed: Jul. 12, 2018

Related U.S. Application Data

(63) Continuation-in-part of application No. 16/001,242, filed on Jun. 6, 2018, and a continuation-in-part of application No. 15/965,891, filed on Apr. 28, 2018.
(Continued)

(51) Int. Cl.
| | |
|---|---|
| *B60R 21/00* | (2006.01) |
| *B60R 21/02* | (2006.01) |
| *G06K 9/66* | (2006.01) |
| *G06K 9/60* | (2006.01) |
| *G05D 1/00* | (2006.01) |
| *G06K 9/00* | (2006.01) |
| *B60W 40/08* | (2012.01) |

(Continued)

(52) U.S. Cl.
CPC .... *G06K 9/00832* (2013.01); *B60R 21/01512* (2014.10); *B60W 40/08* (2013.01); *G06K 9/00221* (2013.01); *G06K 9/00369* (2013.01); *G06N 3/08* (2013.01); *B60R 2300/8013* (2013.01); *B60W 2040/0881* (2013.01); *B60W 2540/043* (2020.02); *G06K 2009/00322* (2013.01); *G06T 2207/30268* (2013.01)

(58) Field of Classification Search
None
See application file for complete search history.

(56) References Cited

U.S. PATENT DOCUMENTS

| | | | |
|---|---|---|---|
| 7,609,893 B2 * | 10/2009 | Luo | G06K 9/00369 382/224 |
| 9,135,420 B2 * | 9/2015 | Felkins | G06F 21/32 |

(Continued)

OTHER PUBLICATIONS

Ren, Shaoqing, et al., "Faster R-CNN: Towards Real-Time Object Detection With Region Proposal Networks", arXiv preprint arXiv:1506.01497v3 [cs.CV], Jan. 6, 2016, 14 pages.
(Continued)

*Primary Examiner* — Adam D Tissot
(74) *Attorney, Agent, or Firm* — Christopher P. Maiorana, PC

(57) ABSTRACT

An apparatus includes a capture device and a processor. The capture device may be configured to generate a plurality of video frames corresponding to an interior view of a vehicle. The processor may be configured to perform operations to detect objects in the video frames, detect occupants of the vehicle and seats of the vehicle based on the objects detected in the video frames, determine an age of the occupants based on characteristics of the occupants and select a reaction if the age of the occupant is below a threshold for the seat. The threshold may be based on a location of the seat within the vehicle. The characteristics may be determined by performing the operations on each of the occupants.

20 Claims, 16 Drawing Sheets

Related U.S. Application Data

(60) Provisional application No. 62/653,008, filed on Apr. 5, 2018.

(51) Int. Cl.
  *B60R 21/015* (2006.01)
  *G06N 3/08* (2006.01)

(56) References Cited

U.S. PATENT DOCUMENTS

| | | | |
|---|---|---|---|
| 2003/0154138 A1* | 8/2003 | Phillips | H04L 63/0861 705/26.1 |
| 2009/0027188 A1* | 1/2009 | Saban | B60N 2/002 340/521 |
| 2017/0129436 A1* | 5/2017 | Chen | H04N 7/183 |
| 2018/0225971 A1* | 8/2018 | Foltin | B60T 7/22 |
| 2019/0225232 A1* | 7/2019 | Blau | B60W 50/0098 |

OTHER PUBLICATIONS

Girshick, Ross, "Fast R-CNN", arXiv: 150408083v2 [cs.CV], Sep. 27, 2015, 9 pages.

Dai, Jifeng et al., "Instance-Aware Semantic Segmentation via Multi-Task Network Cascades", IEEE Conference on Computer Vision and Pattern Recognition (CVPR), 2016, pp. 3150-3158.

Ujjwalkarn, "An intuitive Explanation of Convolutional Neural Networks", https://ujjwalkarn.me/2016/08/11/intuitive-explanation-convnets/, The Data Science Blog, Aug. 11, 2016, 16 pages.

Daniel Smilkov et al., "A Neural Network Playground", http://playground.tensorflow.org, Mar. 10, 2016, 2 pages.

\* cited by examiner

FIG. 15

- 850
- 852 START
- 854 PERFORM COMPUTER VISION OPERATIONS ON OCCUPANT IN DRIVER SEAT
- 856 DETERMINE AGE OF DRIVER
- 858 IS DRIVER TOO YOUNG TO DRIVE? — YES → 868
- NO ↓
- 860 IS DRIVER TOO YOUNG TO DRIVE ALONE? — NO → END
- YES ↓
- 862 IS THERE AN OCCUPANT IN PASSENGER SEAT? — NO → 868
- YES ↓
- 864 DETERMINE AGE OF PASSENGER SEAT OCCUPANT
- 866 IS PASSENGER TOO YOUNG? — YES → 868 NOTIFY VEHICLE OWNER
- NO ↓
- 870 END

AGE DETECTION IN VEHICLES USING COMPUTER VISION

This application relates to U.S. Ser. No. 15/965,891, filed Apr. 28, 2018, which relates to U.S. Provisional Application No. 62/653,008, filed Apr. 5, 2018. This application also relates to U.S. Ser. No. 16/001,242, filed Jun. 6, 2018. Each of the mentioned applications are hereby incorporated by reference in its entirety.

FIELD OF THE INVENTION

The invention relates to computer vision generally and, more particularly, to a method and/or apparatus for implementing age detection in vehicles using computer vision.

BACKGROUND

Air bags save lives. Air bags can also cause significant harm to occupants (i.e., small children in the front seat, babies, passengers with feet on the dashboard, etc.). Without knowledge of occupants within the vehicle, air bag deployment cannot be adjusted to account for various traits and/or conditions of different occupants. Most air bags are designed for an average adult body size (i.e., usually an average adult male). However, people are many different sizes.

Children in particular are known to be at risk when air bags are deployed. Children are the only subgroup of the population that is known to have experienced a net increase in risk of death attributable to the installation of air bags. Even in relatively low-speed crashes that would not have resulted in a fatality, children can be killed or seriously injured by passenger-side air bags. Some vehicles provide switches to enable and disable passenger air bags. However, these switches are often based on weight, or are manual switches. Disabling the passenger air bag for an adult also increases risk of injury.

Generally, children younger than age 12 are not recommended to be seated in the passenger seat. Since air bags are designed for adults, children who are forward-facing may be thrown forward due to rapid deceleration, causing the head/neck to be placed in the deployment zone of the rapidly inflating air bag. Rear-facing child seats are not recommended in the passenger seat.

When infants are seated in rear-facing infant restraints in the front seat, the head and neck are in close proximity to the air bag housing and fatal head/neck injuries can result from the force of the rapidly inflating air bag hitting the child safety seat.

Vehicle owners may also have a concern if a driver that is too young is driving the vehicle. Sometimes teenagers take a car for a joyride. Some jurisdictions require an adult to be in the vehicle with a newly licensed driver.

It would be desirable to implement age detection in vehicles using computer vision.

SUMMARY

The invention concerns an apparatus comprising a capture device and a processor. The capture device may be configured to generate a plurality of video frames corresponding to an interior view of a vehicle. The processor may be configured to perform operations to detect objects in the video frames, detect occupants of the vehicle and seats of the vehicle based on the objects detected in the video frames, determine an age of the occupants based on characteristics of the occupants and select a reaction if the age of the occupant is below a threshold for the seat. The threshold may be based on a location of the seat within the vehicle. The characteristics may be determined by performing the operations on each of the occupants.

BRIEF DESCRIPTION OF THE FIGURES

Embodiments of the invention will be apparent from the following detailed description and the appended claims and drawings in which:

FIG. 15 is a flow diagram illustrating a method for analyzing the age of a passenger in response to a determined age of a driver.

DETAILED DESCRIPTION OF THE EMBODIMENTS

Embodiments of the present invention include providing age detection in vehicles using computer vision that may (i) utilize interior cameras of a vehicle, (ii) provide warnings when an occupant is too young to be in a passenger seat, (iii) modify deployment of air bags based on characteristics of an occupant, (iv) detect a driver that may be too young, (v) determine characteristics of occupants of a vehicle, (vi) implement fleet learning to train a convolutional neural network, (vii) utilize computer vision with sensor fusion and/or (viii) be implemented as one or more integrated circuits.

Embodiments of the present invention may utilize interior cameras, exterior cameras and communication systems of vehicles (e.g., 3G, 4G, LTE, 5G, etc.). The present invention may implement computer vision to determine information about the interior and/or exterior of a vehicle. Using computer vision, embodiments of the present invention may classify and/or determine characteristics of objects in a vehicle (e.g., occupants, seats, steering wheels, handheld devices, seatbelts, etc.). In an example, the age and/or body characteristics of an occupant may be analyzed to determine whether there may be a safety risk for the occupant in a particular seat. If the seat is occupied by an occupant that does not meet particular thresholds, then a reaction may be performed to encourage following safety recommendations. In another example, if the computer vision determines that the driver is too young to be driving, a notification may be provided to the owner of the vehicle. By using computer vision to determine and/or understand the characteristics of each occupant of the vehicle, suitable reactions may be performed to encourage following age-related safety standards and/or recommendations.

Figure 1:
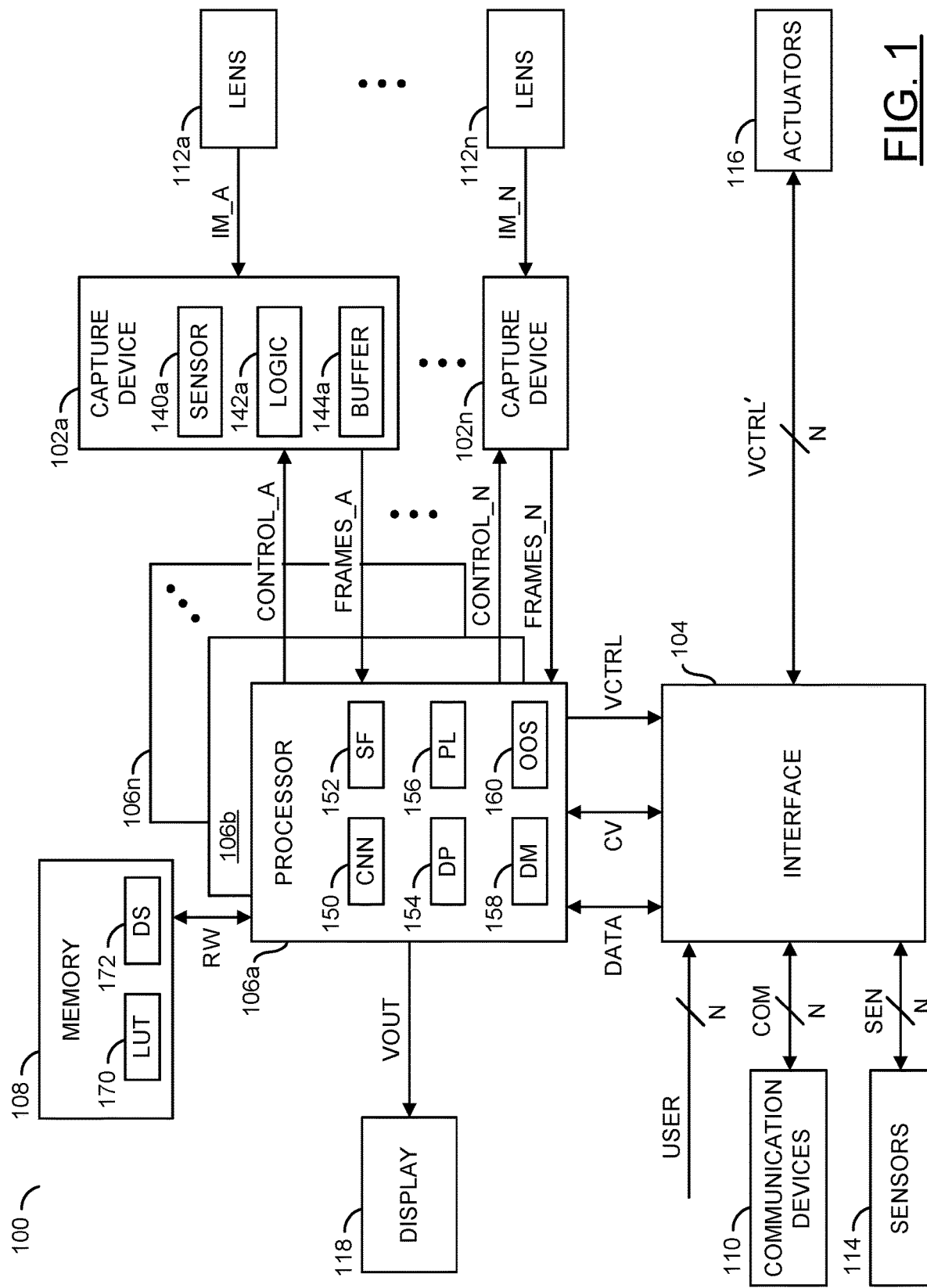
FIG. 1 is a diagram illustrating an embodiment of the present invention.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or a block (or circuit) 118. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuit 118 may implement a display. The apparatus 100 may comprise other components (not shown). The number, type and/or arrangement of the components of the apparatus 100 may be varied according to the design criteria of a particular implementation.

In various embodiments of the apparatus 100, the components 102a-118 may be implemented as a distributed camera system 100. In the distributed system embodiment of the apparatus 100, each component may be implemented separately throughout an installation location (e.g., such as a vehicle). In some embodiments of the apparatus 100, the components 102a-118 may be implemented on a printed circuit board (e.g., a single module). In the single module embodiment, each component may be connected to a single module (e.g., such as a circuit board on a small device such as a drone). In some embodiments, some of the components 102a-118 may be implemented on a single module and some of the components 102a-118 may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle).

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118 may be implemented as part of another one of the components 102a-118. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., the display 118).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 60a-60n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-

CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMESN, transmit the signal VCTRL, a signal (e.g., VOUT) and/or send/receive the signal DATA, the signal CV and/or a signal (e.g., RW). The signal VOUT may provide a video data output to the display 118. The signal RW may communicate data to/from the memory 108. The signal VOUT, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170 and/or a block (or circuit) 172. The block 170 may implement a look up table. The block 172 may implement data storage. The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, etc. The actuators 116 may control various components of the host vehicle. The number, type and/or functionality of the actuators 116 may be varied according to the design criteria of a particular implementation.

The display 118 may be a screen and/or an output device. In one example, the display 118 may implement an electronic mirror (e.g., an e-mirror). In another example, the display 118 may implement a touchscreen for an infotainment system. In yet another example, the display 118 may implement a back-up camera and/or bird's eye view camera. The display 118 may display a version of video frames captured by one or more of the lenses 112a-112n and/or the capture devices 102a-102n. The video frames captured by the capture device 102a-102n may be cropped, adjusted and/or encoded by the processors 106a-106n to fit the display 118. For example, the processor 106a-106n may provide real-time video streaming to the display 118 via the signal VOUT.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. Details of the computer vision implemented by the CNN module 150 may be described in association with FIG. 5.

The sensor fusion module 152 may be configured to analyze information from multiple sensors 114 and/or capture devices 102a-102n for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.) and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing, downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection and/or high dynamic range processing. The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the display 118 (e.g., the signal VOUT).

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of the display 118 by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the display 118. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signal VOUT may be an encoded, cropped, stitched and/or enhanced version of one or more of the signals FRAMES_A-FRAMES_N. The signal VOUT may be a high resolution, digital, encoded, de-warped, stabilized, cropped, blended, stitched and/or rolling shutter effect corrected version of the signals FRAMES_A-FRAMES_N.

Figure 2:
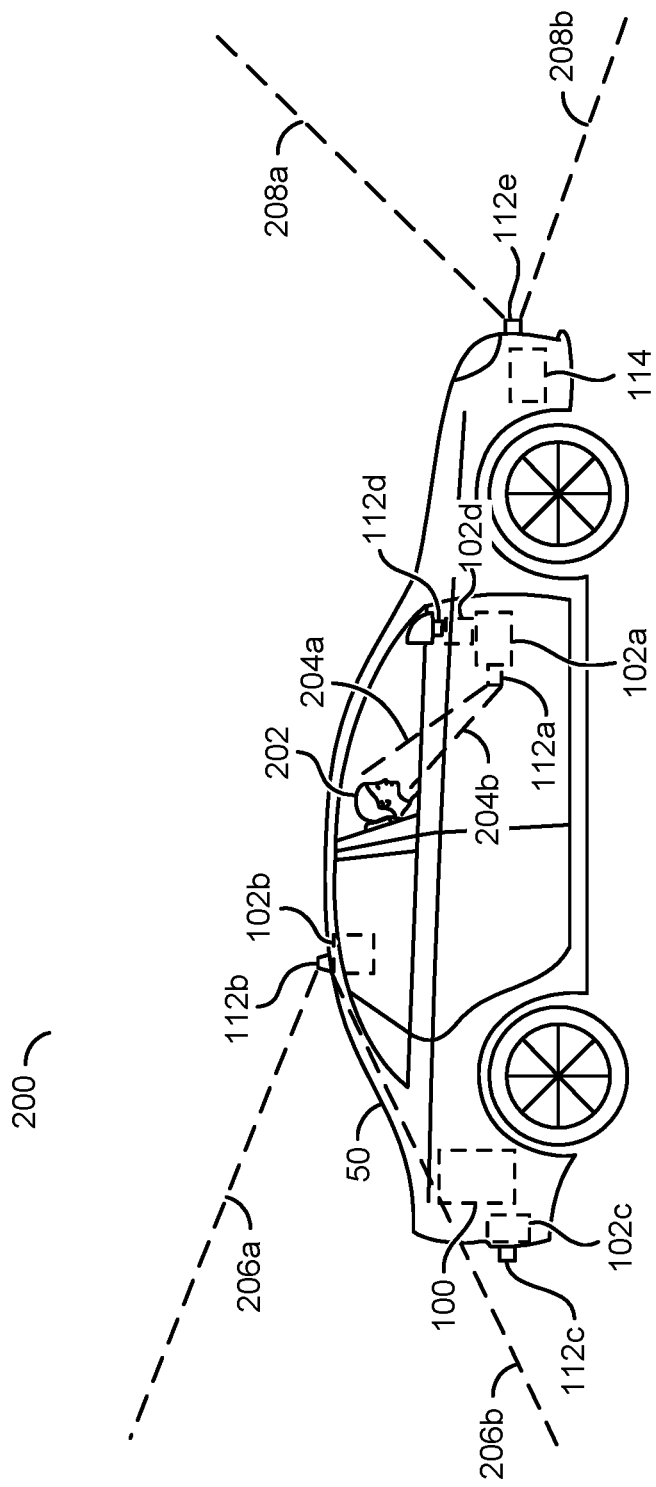
FIG. 2 is a diagram illustrating an example of camera systems inside and outside of a vehicle.

Referring to FIG. 2, an example embodiment 200 of camera systems inside and outside of a vehicle is shown. An automobile/vehicle 50 is shown. The apparatus 100 is shown as a component of the vehicle 50. In the example shown, the vehicle 50 is a car. In some embodiments, the vehicle 50 may be a truck, an ATV, an airplane, a drone, etc. The type of the vehicle 50 implementing the apparatus 100 may be varied according to the design criteria of a particular implementation.

A driver 202 is shown seated in the vehicle 50. The vehicle sensors 114 are shown on (or in) the vehicle 50. The apparatus 100 is shown in the rear of the vehicle 50. In another example, the apparatus 100 may be distributed throughout the vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the vehicle 50 (e.g., detecting the driver 202). A targeted view of the driver 202 (e.g., represented by a line 204a and a line 204b) is shown being captured by the capture device 102a. The capture device 102a may also detect other objects in the vehicle 50 (e.g., a seat, a head rest, an arm rest, a rear window, a seatbelt, a center console, other occupants, etc.). By analyzing video of the driver 202 and/or other occupants of the vehicle 50 (e.g., extracting video data from the captured video), the processors 106a-106n may determine a body position and/or body characteristics (e.g., a distance, orientation and/or location of the body and/or head) of one or more occupants of the vehicle 50 and/or objects within the vehicle 50.

In some embodiments, more than one of the capture devices 102a-102n may be used to capture video data of the driver 202 and/or other occupants of the vehicle 50. A combination of inputs from the signals FRAMES_A-FRAMES_N may be implemented to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the vehicle 50. In the example shown, the targeted view from the vehicle 50 (e.g., represented by a line 206a and a line 206b) is shown capturing an exterior view to the rear of (e.g., an area behind) the vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the vehicle 50. The processors 106a-106n may implement computer vision to detect objects and/or understand what is happening near the vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

Figure 3:
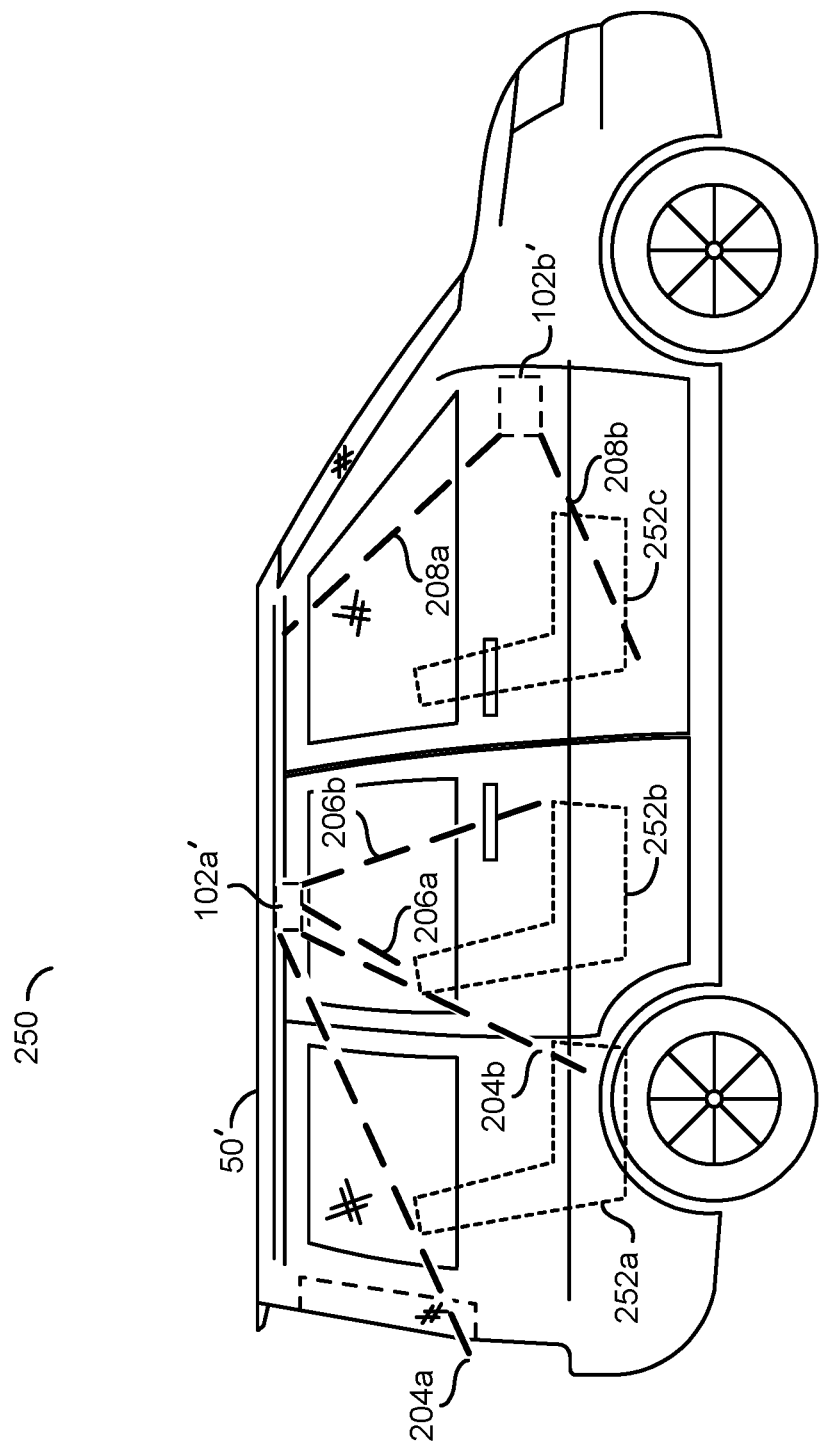
FIG. 3 is a diagram illustrating an example of interior camera systems configured to monitor vehicle occupants.

Referring to FIG. 3, a diagram illustrating an example 250 of interior camera systems configured to monitor vehicle occupants is shown. Various camera angles of an interior of the vehicle 50' are shown. Multiple rows of seats 252a-252c are shown in the vehicle 50'. Each of the rows of seats 252a-252c may be monitored to detect and/or classify one or more occupants of the vehicle 50'.

The capture device 102a' is shown mounted on a ceiling of the vehicle 50'. The capture device 102a' is shown having an angle 204a and an angle 204b (e.g., a field of view) that points toward the back row of seats 252a. The capture device 102a' may also have a field of view angle 206a-206b to capture the middle row of seats 252b. In another example, the capture device 102a' may implement a wide angle lens to capture both rows of seats. The field of view from the angle 204a and the angle 204b may provide a targeted view of the interior of the vehicle 50'. Similarly, the capture device 102b' may capture an interior of the vehicle 50'. An angle 208a and an angle 208b may represent a field of view capturing the front row of seats 252c. The multiple fields of view captured by the capture devices 102a'-102n' may be a targeted wide angle view of the interior of the vehicle 50'. The number of angles and/or fields of view may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver, other occupants, physical characteristics of people in the vehicle, facial expressions of people in the vehicle, fields of view of the people in the vehicle, etc.). The processors 106a-106n may be configured to determine an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person. For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands)

and/or determine a vulnerability of an occupant (e.g., a non-moving occupant may be asleep and/or unconscious).

In some embodiments, the processors 106a-106n may implement depth-sensing techniques. The depth-sensing techniques may compare knowledge of the dimensions of the vehicle 50' to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the vehicle 50'. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the vehicle 50' was parked, when the vehicle 50' came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the vehicle 50'. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to the display 118 (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

Figure 4:
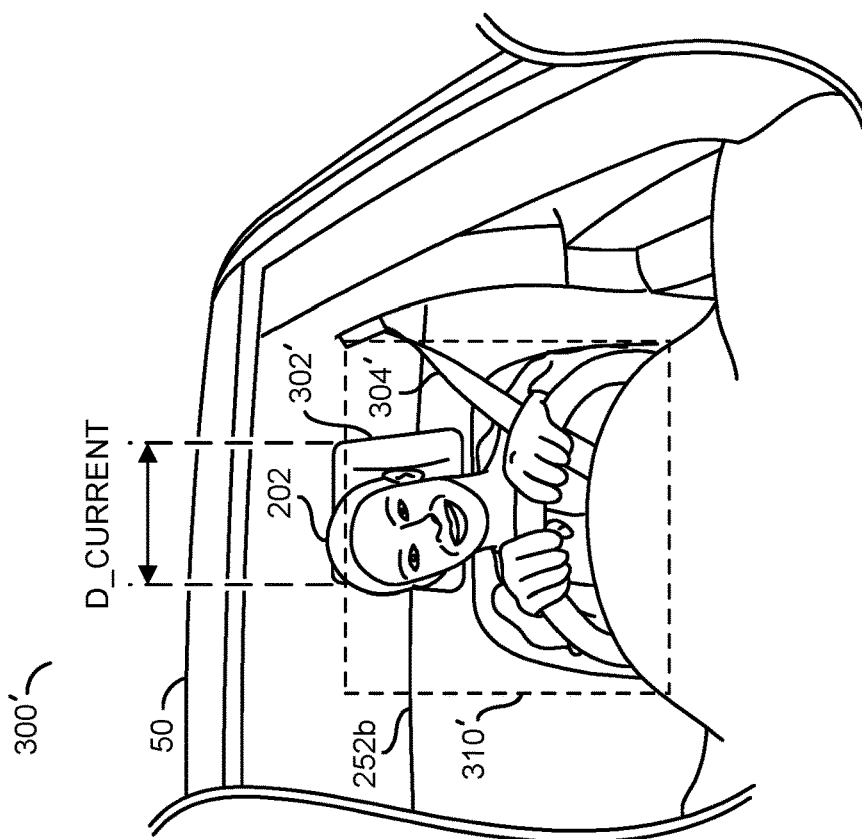
FIG. 4 is a diagram illustrating an object comparison between a reference video frame and a captured video frame.
Figure 4:
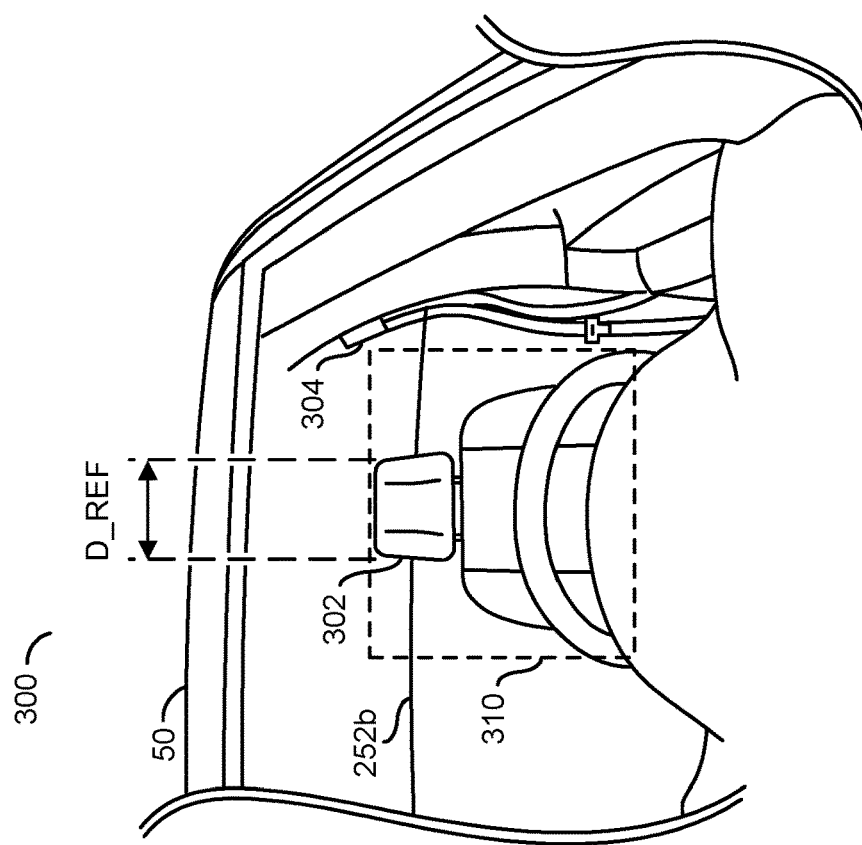

Referring to FIG. 4, a diagram illustrating an object comparison between a reference video frame 300 and a current video frame 300' is shown. The reference video frame 300 and the current video frame 300' may be video frames processed by the processors 106a-106n (e.g., generated in response to the signals FRAMES_A-FRAMES_N by one of the capture devices 102a-102n). The reference video frame 300 and the current video frame 300' may be a targeted view directed towards the interior of the vehicle 50. In an example, the lens 112a mounted on the dashboard of the vehicle 50 may capture the reference video frame 300 and the current video frame 300'. The view captured for each of the video frames may be varied according to the design criteria of a particular implementation.

The reference video frame 300 may be a video frame captured at an earlier time than the current video frame 300'. For example, the reference video frame 300 may be stored in the memory 108 (e.g., in the data storage portion 172). In some embodiments, the reference video frame 300 may be pre-loaded in the apparatus 100. For example, the reference video frame 300 may be captured by implementing fleet learning (e.g., to be described in more detail in association with FIG. 5). In some embodiments, the reference video frame 300 may be captured when the vehicle 50 is idle and/or turned off. In some embodiments, the reference video frame 300 may be captured periodically. The method of capturing the reference video frame (or frames) 300 may be varied according to the design criteria of a particular implementation.

The reference video frame 300 shown may be a representative example of one or more reference video frames implemented by the apparatus 100. In an example, reference video frames 300 may be captured for many different scenarios and/or locations within or outside of the vehicle 50. For example, the reference video frames 300 may be captured for a driver seat, a passenger seat, for each seat of the rows 252a-252c, the interior of the vehicle 50, the exterior of the vehicle 50, etc. Generally, the reference video frame 300 is used by the processors 106a-106n to classify, analyze and/or store reference objects. The reference objects may be used by the processors 106a-106n to compare with objects captured in the current video frame 300'. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. The types of reference objects and/or characteristics of the reference objects may be varied according to the design criteria of a particular implementation.

In the example reference video frame 300, a reference object 302 is shown. In the example shown, the reference object 302 may be a head rest of the driver side seat. The CNN module 150 may determine the width (e.g., D_REF) of the reference object 302 (e.g., based on the number of pixels occupied in the reference video frame 300). In some embodiments, the look up table 170 may store the width D_REF. The width D_REF may be determined when the reference object 302 is at a known distance from the lens 112a.

In the example reference video frame 300, a reference object 304 is shown. In the example shown, the reference object 304 may be a driver seat belt. The CNN module 150 may determine a location of the seat belt 304 (e.g., a location based on a horizontal and/or vertical pixel count). In some embodiments, sensors 114 may provide an indication of the status of the seat belt 304 (e.g., clicked into place, unused, etc.). The sensor fusion module 152 may use the computer vision data from the CNN module 150 and/or the readings of the sensors 114 to determine a confidence level of the status of the seat belt 304. In the example shown, the reference video frame 300 may provide a reference for when the status of the seat belt 304 is unused (e.g., not being worn by a passenger/driver).

In the example reference video frame 300, a reference object 310 is shown. In the example shown, the reference object 310 may be an unoccupied seat. For example, the CNN module 150 may recognize color, shape, distance, stitching, design, etc. of the reference object 310.

The current video frame 300' may be one or more video frames analyzed by the processors 106a-106n (e.g., a video frame within the video pipeline 156). The current video frame 300' may be analyzed by the processors 106a-106n in real-time (e.g., within approximately 500 ms). The CNN module 106a-106n may perform a computer vision analysis on the current video frame 300' and/or compare features and/or characteristics of the current video frame 300' to one or more reference video frames.

The current video frame 300' shows the vehicle 50, the driver 202, the detected object 302', the detected object 304' and/or the detected object 310'. In the current video frame 300', the head rest 302' may be closer to the lens 112a than in the reference video frame 300. In the current video frame 300', the status of the seat belt 304' may be determined to be worn by the driver 202 (e.g., detected across the chest of the driver 202). In the current video frame 300', the detected object 310' may be the driver 202 sitting in the driver seat (e.g., an object covering the details of the empty seat 310 in the reference video frame 300). The processors 106a-106n may detect and/or determine characteristics of various sub-objects of the detected object 310'. In an example, the processors 106a-106n may identify sub-objects such as the eyes of the driver 202, locations of the arms and hands (e.g., holding the steering wheel), location of the hands on the steering wheel (e.g., at the ten and two position of the steering wheel) an angle of the head, a rotation of the head, field of view of the driver (e.g., direction of the eyes), body rotation, body lean, body orientation, a color of clothing, etc.

In some embodiments, one or more of the reference objects (e.g., the head rest 302) may be physically connected to the vehicle 50. In an example, the reference objects may be an arm rest, a steering wheel, the rear seat row 252n, a dashboard, a sunroof and/or a moon roof. The reference object 302 may be a vehicle component that is capable of relative movement with respect to the lens 112a. In some embodiments, the reference object (e.g., the head rest 302) may be used to determine a distance of the driver 202 from the lens 112a (e.g., objects that correlate to where the driver 202 is seated).

For example, if the headrest 302' is determined to be 4.5 feet away (e.g., by comparing the current size D_CURRENT to the reference size D_REF to infer a distance) from the lens 112a then an average sitting posture and head size may be used to estimate that the eyes of the driver 202 may be 3.5 feet from the lens 112a. In another example, the capture device 102a may implement depth-sensing technology to determine how far away the driver 202 is from the lens 112a. In yet another example, stereo video processing may be implemented by the processors 106a-106n to generate a depth map to determine how far away the driver 202 is from the lens 112a. Using the depth information and/or a horizontal and vertical position of the detected object 310', the processors 106a-106n may determine the position (e.g., 3D coordinates and/or location coordinates) of the driver 202 and/or particular body parts of the driver 202.

In some embodiments, the processors 106a-106n may compare the current video frame 300' to the reference video frame 300. In some embodiments, the current video frame 300' may not be directly compared to the reference video frame 300. For example, the CNN module 150 may implement deep learning to gather information and/or statistics about various features of objects. The CNN module 150 may determine features of objects corresponding to the current video frame 300'. The processors 106a-106n may compare the features extracted from the current video frame 300' to features extracted from numerous reference video frames. For example, the reference video frame 300 and/or the current video frame 300' may be used as training data for the CNN module 150. The types of features extracted from video frames to perform the computer vision analysis may be varied according to the design criteria of a particular implementation.

Figure 5:
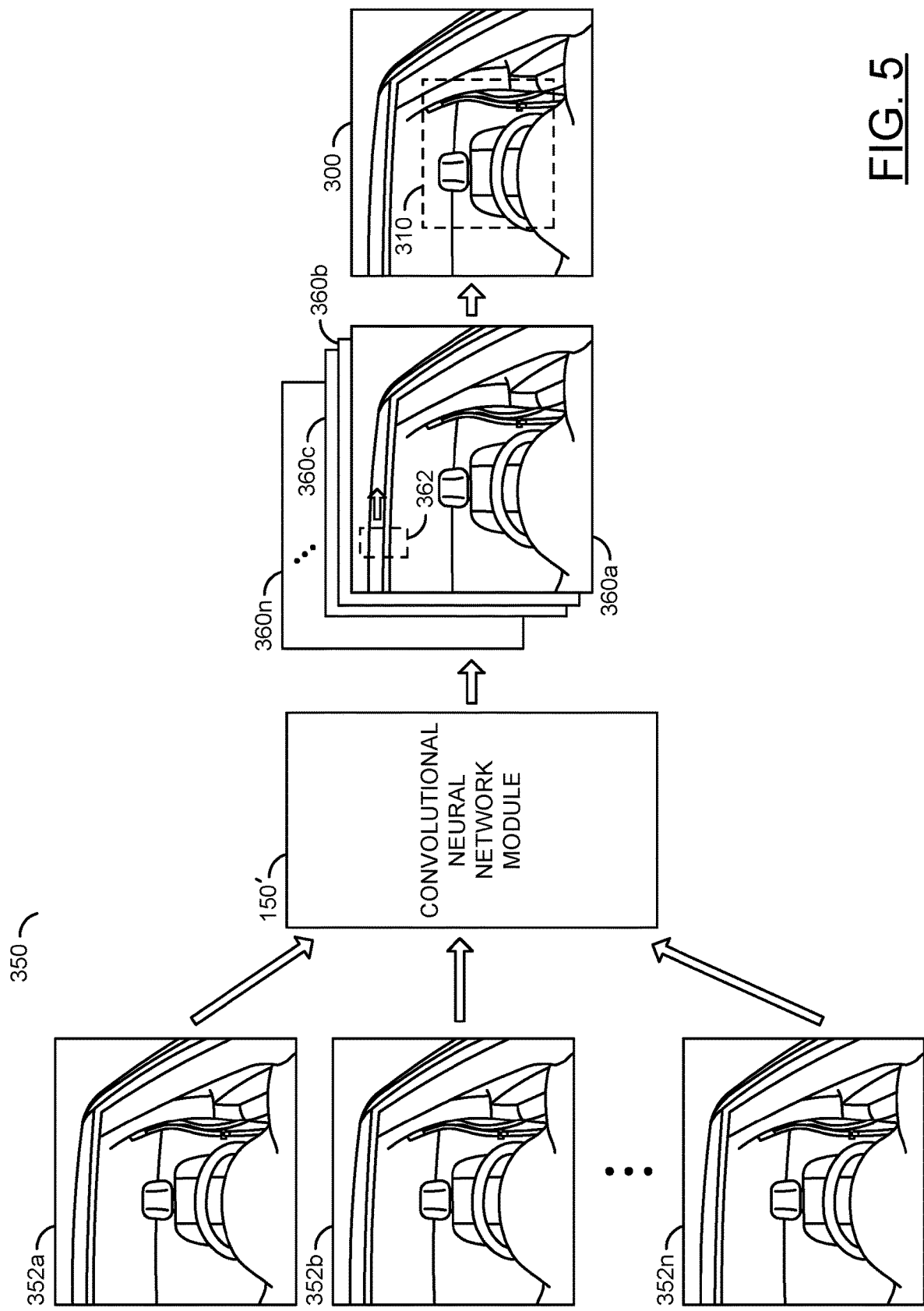
FIG. 5 is a diagram illustrating an example visualization of training a convolutional neural network for object detection using fleet learning.

Referring to FIG. 5, a diagram illustrating an example visualization 350 of training the convolutional neural network 150' for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before installed in the vehicle 50). For example, the results of training data 352a-352n may be pre-programmed and/or loaded into the processors 106a-106n. In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture an unoccupied interior of a vehicle. Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, $YC_bC_r$, $YP_bP_r$, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location.

Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 300. The reference video frame 300 may comprise masks and/or categorized instances of the reference objects 310. The reference objects 310 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'

Figure 6:
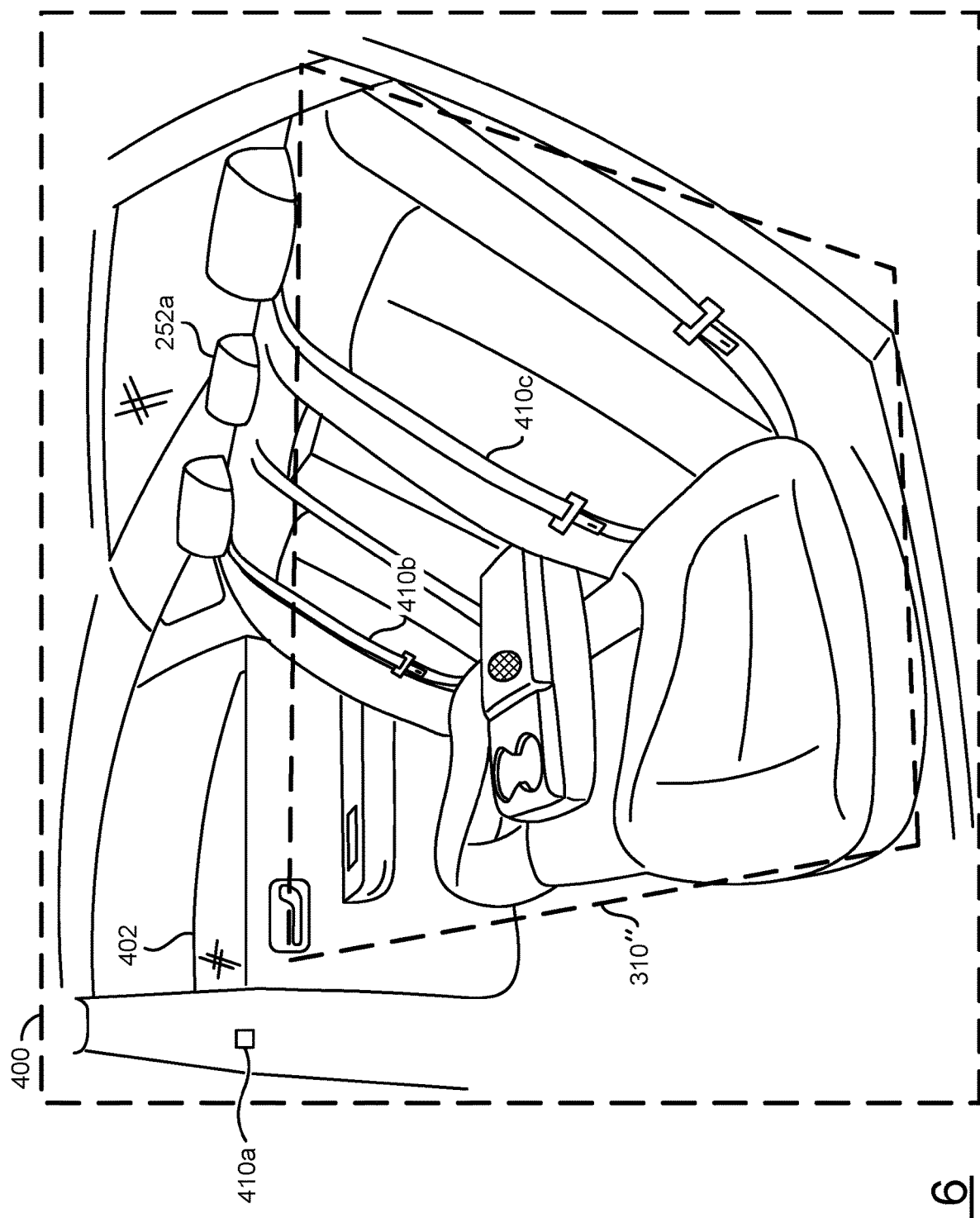
FIG. 6 is a diagram illustrating detecting reference objects corresponding to an empty vehicle seat in a video frame.

Referring to FIG. 6, a diagram illustrating detecting reference objects 310" corresponding to an empty vehicle seat in a video frame 400 is shown. The video frame 400 may be video data (e.g., one example video frame from a series of video frames in the video data) of the interior of the vehicle 50. The video frame 400 may be an example targeted wide angle view of the interior of the vehicle 50 captured by one of the capture devices 102a-102n. The video frame 400 is shown directed at the back row of seats 252a.

In some embodiments, the video frame 400 may be an example of reference frame. For example, the reference frame 400 may be used by the apparatus 100 to learn the locations of various reference objects in the vehicle 50. In another example, the video frame 400 may be used as video data for the training data 352a-352n. In yet another example, the video frame 400 may be an example of a current video frame undergoing the computer vision operations.

An open window 402 is shown in the video frame 400. In some embodiments, the locations of windows may be used to train the CNN module 150. In some embodiments, the processors 106a-106n may determine characteristics of various objects detected in the video frame 400. In the example shown, the processors 106a-106n may determine the characteristic of the window 402 is open.

Examples of mitigation responses 410a-410c are shown in the video frame 400. In some embodiments, the mitigation responses 410a-410c may be deployed and/or activated in response to a collision and/or an imminent collision. For example, the capture devices 102a-102n that provide an exterior view from the vehicle 50 may determine that an impact, collision and/or evasive maneuver is imminent by analyzing the video data and/or using the sensor fusion module 152 to analyze the sensors 114. To protect occupants of the vehicle 50, the mitigation responses 410a-410c may be deployed (e.g., before the impact and/or when the impact is detected). The apparatus 100 may generate the signal VCTRL' to activate one or more of the actuators 116. The actuators 116 may be used to operate on the mitigation response devices 410a-410c.

In the example shown, the mitigation response device 410a may be an air bag (e.g., a side air bag). In the example shown, the mitigation response device 410b and/or the mitigation device 410c may be seatbelts. For example, in response to the imminent collision, the actuators 116 may activate seatbelt pre-tensioning for the seatbelts 410b-410c. In another example, in response to the imminent collision, the actuators 116 may deploy the air bag 410a. The number and/or types of the mitigation response devices 410a-410c implemented may be varied according to the design criteria of a particular implementation. For example, the interface 104 may translate instructions from the processors 106a-106n to corresponding signals compatible with the actuators 116. In some embodiments, the interface 104 may provide an API for the actuators 116. For example, the interface 104 may translate a command to slow down from the processors 106a-106n based on the available actuators 116.

An example detected object 310" is shown. The example detected object 310" may be an unoccupied seat. In some embodiments, the unoccupied seat 310" may be a reference object used for comparison when a person is in the same seat in another video frame. In some embodiments, when the video frame 400 is a current video frame, the unoccupied seat 310" may represent a portion of the vehicle 50 that is the least vulnerable and/or not vulnerable. For example, if the unoccupied seat 310" does not have an occupant, then any mitigation reactions initiated by the apparatus 100 for the unoccupied seat 310" may be considered a low priority.

Figure 7:
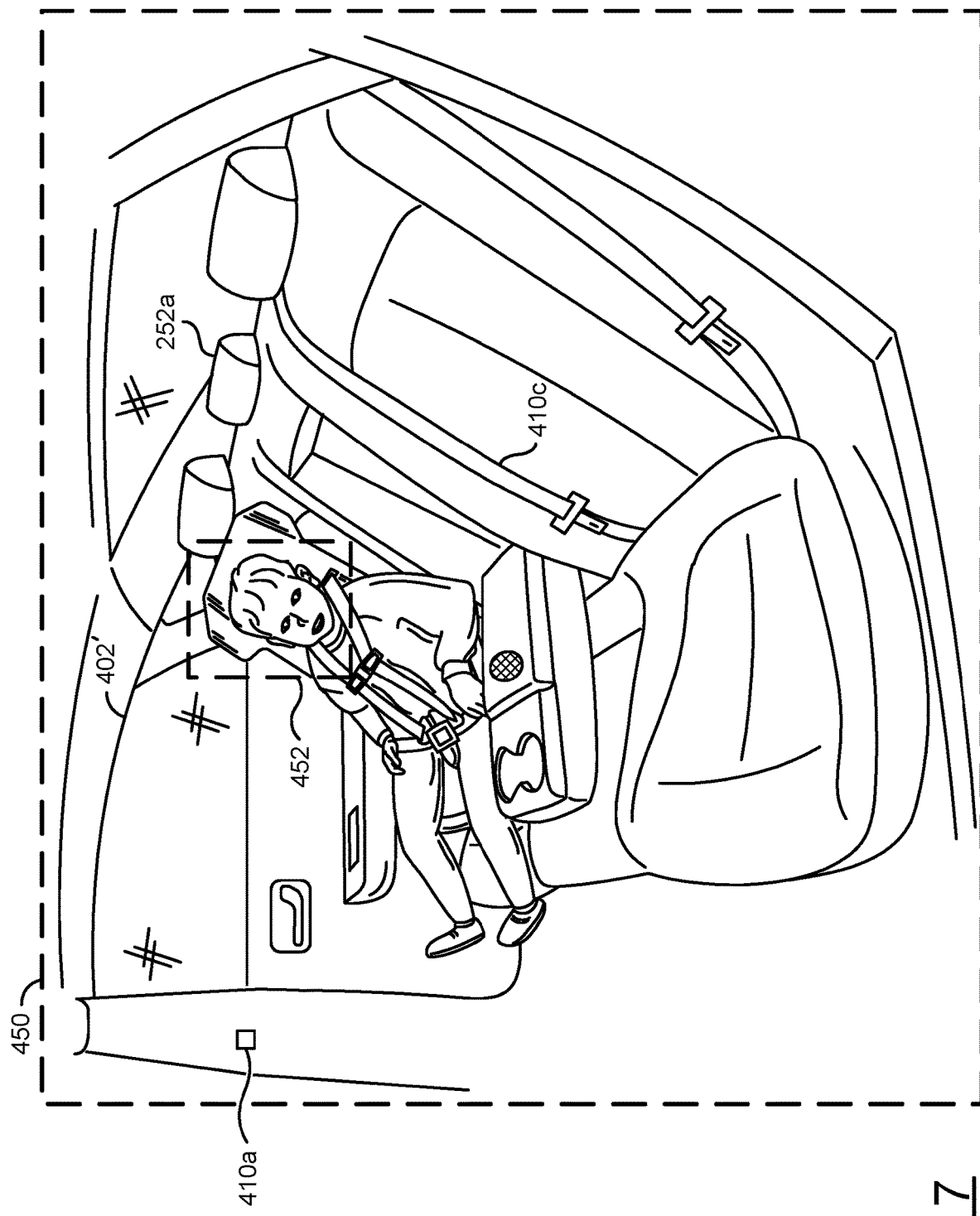
FIG. 7 is a diagram illustrating detecting a child in a video frame.

Referring to FIG. 7 a diagram illustrating detecting an occupant in a video frame 450 is shown. The video frame 450 may be video data (e.g., one example video frame from a series of video frames in the video data) of the interior of the vehicle 50. The video frame 450 may be generated similar to the video frame 400 (e.g., described in association with FIG. 6).

The video frame 450 is shown directed at the back row of seats 252a. An occupant 452 is shown in the video frame 450. In the example shown, the occupant 452 may be a small child. The small child 452 may be an example of a vulnerable occupant.

Generally, the driving policy module 154 may determine a vulnerability of the occupant 452. In some embodiments, different product vendors may program the driving policy module 154 with preferences on how to rank the vulnerability of the occupant 452. In some embodiments, the driving policy module 154 may be programmed according to local regulations. How the vulnerability of the occupant 452 is determined may be varied according to the design criteria of a particular implementation.

The processors 106a-106n may utilize the CNN module 150 to identify, detect and/or classify the occupant 452 (e.g., as a small child, in the example shown). The CNN module 150 may implement the computer vision operations to determine the characteristics of the occupant 452 (e.g., age, body position, whether the occupant is pregnant, etc.). The processors 106a-106n may utilize the classification of the occupant 452 and/or the characteristics of the occupant 452 determined using the computer vision operations in conjunction with the driving policy module 154 to determine the vulnerability of the occupant 452.

The level and/or rank of vulnerability determined by the processors 106a-106n may not imply a weakness, frailty and/or importance of the occupants 452. For example, in a traditional emergency situation, saving women and children is often prioritized. The vulnerability may comprise a likelihood of harm and/or a need for protection. For example, the occupant 452 that is closer to the impact point may be more vulnerable than another of the occupants 452. In another example, particular body parts (e.g., head, chest, arteries, etc.) may be more vulnerable than other body parts due to the risk of catastrophic injury. The level and/or rank of vulnerability of a particular occupant may change (e.g., more vulnerable if a vital body part is exposed, more vulnerable if not wearing a seat belt, less vulnerable if wearing a helmet, etc.). The level and/or rank of vulnerability may be used to prioritize which of the occupants 452 to protect when selecting the impact mitigation reaction.

In one example, a baby may be considered a highly vulnerable occupant. In another example, a healthy adult may be considered less vulnerable than a child. In yet another example, an elderly person may be considered more vulnerable than a healthy adult. In still another example, a person who is pregnant may be considered highly vulnerable. In another example, an empty seat may have the lowest vulnerability ranking since there may be nothing to protect. In yet another example, a pet may be considered less vulnerable than a child. In some embodiments, inanimate objects may have some degree of vulnerability compared to other objects (e.g., a highly valued object might be more important to protect than a worthless item). The level of vulnerability for the occupant 452 may be varied according to the design criteria of a particular implementation.

Generally, each occupant 452 of the vehicle 50 may be detected by the processors 106a-106n. The processors 106a-106n may determine various characteristics of the occupants 452 to determine how vulnerable each occupant may be. Each occupant 452 may be accorded a level of vulnerability according to the driving policy module 154. In an example, the level of vulnerability may enable the processor 106a-106n to rank a vulnerability of each of the occupants (e.g., from highest to lowest).

In some embodiments, based on the vulnerability ranking, the processors 106a-106n may determine how to prioritize any impact mitigation reactions. For example, the safety of a person carrying a child may be prioritized over a healthy adult since the healthy adult may be more likely to withstand injury.

In some embodiments, the processors 106a-106n may implement the computer vision operations to understand how a person may be vulnerable. In an example, a healthy adult may be vulnerable if the adult is riding in the passenger seat having a body position with feet resting on the dashboard (e.g., deploying an air bag as an impact mitigation reaction may cause more harm based on the body position). In another example, particular areas of the body of the occupants 452 may be more vulnerable (e.g., the midsection of a pregnant woman may be more vulnerable than the shoulders of the same person). How the vulnerability of occupants 452 are ranked and/or how different areas of the body of each occupant 452 are ranked may be varied according to the design criteria of a particular implementation.

The CNN module 150 may be configured to classify objects as the occupant 452. The CNN module 150 may further classify the occupant as a particular type and/or class of occupant (e.g., a child, a pet, an adult, an elderly person, a differently-abled person, etc.). The CNN module 150 may further determine characteristics of the occupant 452 based on the characteristics detected. The processor 106a-106n and/or the driving policy module 154 may determine a vulnerability of the occupant 452 based on the classification and/or the characteristics detected using the computer vision operations. The types of object classifications may be varied according to the design criteria of a particular implementation.

The video analytics and/or computer vision operations performed by the CNN module 150 may process the video frame 450 and/or other video signals for biometric markers to determine the characteristics of the occupant 452. For example, one or more of age, height and/or weight may be biometric markers used to determine the vulnerability of the occupant 452. The biometric markers may be used to differentiate between a child, an adolescent, etc. (e.g., a person that may not be capable of protecting themselves) and a young adult, teenager, adult, etc. (e.g., a person that may be less vulnerable).

In some embodiments, the age, height, weight and/or other biometric markers (e.g., characteristics) used to determine the vulnerability of the occupant 452 may be similar to attributes used in regulations for sitting in the front seat of a vehicle and/or other vehicle safety regulations. Various biometric markers may be stored as reference data in the look up table 170. For example, the look up table 170 may store different heights, weights, ages, etc. applicable to different regions (e.g., based on different regulations in a particular city/state/province/country). The types of biometric markers used to determine a vulnerability of the occupant 452 may be varied according to the design criteria of a particular implementation.

In some embodiments, the CNN module 150 may be configured to detect faces in the video frame 450. In some embodiments, the processor 106a-106n may be configured to recognize faces through facial recognition (e.g., based on faces stored as references in the memory 108). The vulnerability of the occupant 452 may be stored in the look up table 170 in association with the facial detection information corresponding to the occupant 452.

A high confidence level for a vulnerability and/or detection of a particular occupant may indicate that the computer vision result is consistent with the particular type of object (e.g., occupant). A low confidence for a vulnerability and/or detection of a particular occupant may indicate that the computer vision result is inconsistent with the particular type of object (e.g., occupant). Various checks may be performed to determine the confidence level. The vulnerability ranking may be performed when the confidence level is above a pre-defined threshold. In some embodiments, information from the vehicle sensors 114 (e.g., an amount of weight detected in a particular seat) may be used to adjust the confidence level.

The impact mitigation may comprise automatic responses by the vehicle 50 (e.g., using the actuators 116) implemented to improve a safety, reduce an amount of injury, increase a chance of survival and/or improve comfort of the occupant 452. For example, the processors 106a-106n may generate the signal VCTRL to the interface 104 and the interface 104 may forward the signal VCTRL' to the appropriate one of the actuators 116 to perform the impact mitigation reaction.

In some embodiments, the window 402' may be one of the mitigation response devices 410a-410c. In the example shown, the window 402' may be determined by the computer vision operations to be in a closed state. For example, opening the window 402' may be an appropriate impact mitigation response to enable the occupant 452 to escape a vehicle after a collision and/or enable rescue workers easier access to the occupant 452 of the vehicle 50. In another example, keeping the window 402' closed may be an appropriate impact mitigation reaction if the vehicle 50 has been submerged in water after a collision to prevent the occupant 452 from drowning.

The apparatus 100 may be configured to distinguish between objects interior to the vehicle 50 (e.g., the small child 452) and objects exterior to the vehicle 50 (e.g., a pedestrian outside the window 402'). For example, depth-sensing techniques may be implemented to determine which of the objects detected in the video frame 450 are inside the vehicle 50. In another example, the video frames from the interior of the vehicle 50 may be compared with video frames of the outside area of the vehicle 50 (e.g., one of the capture devices 102a-102n may capture a similar view outside of the vehicle 50 that may be seen through the window 402' from the video frame 450 captured by another one of the capture devices 102a-102n) to determine which objects are interior and which objects are exterior to the vehicle 50.

Figure 8:
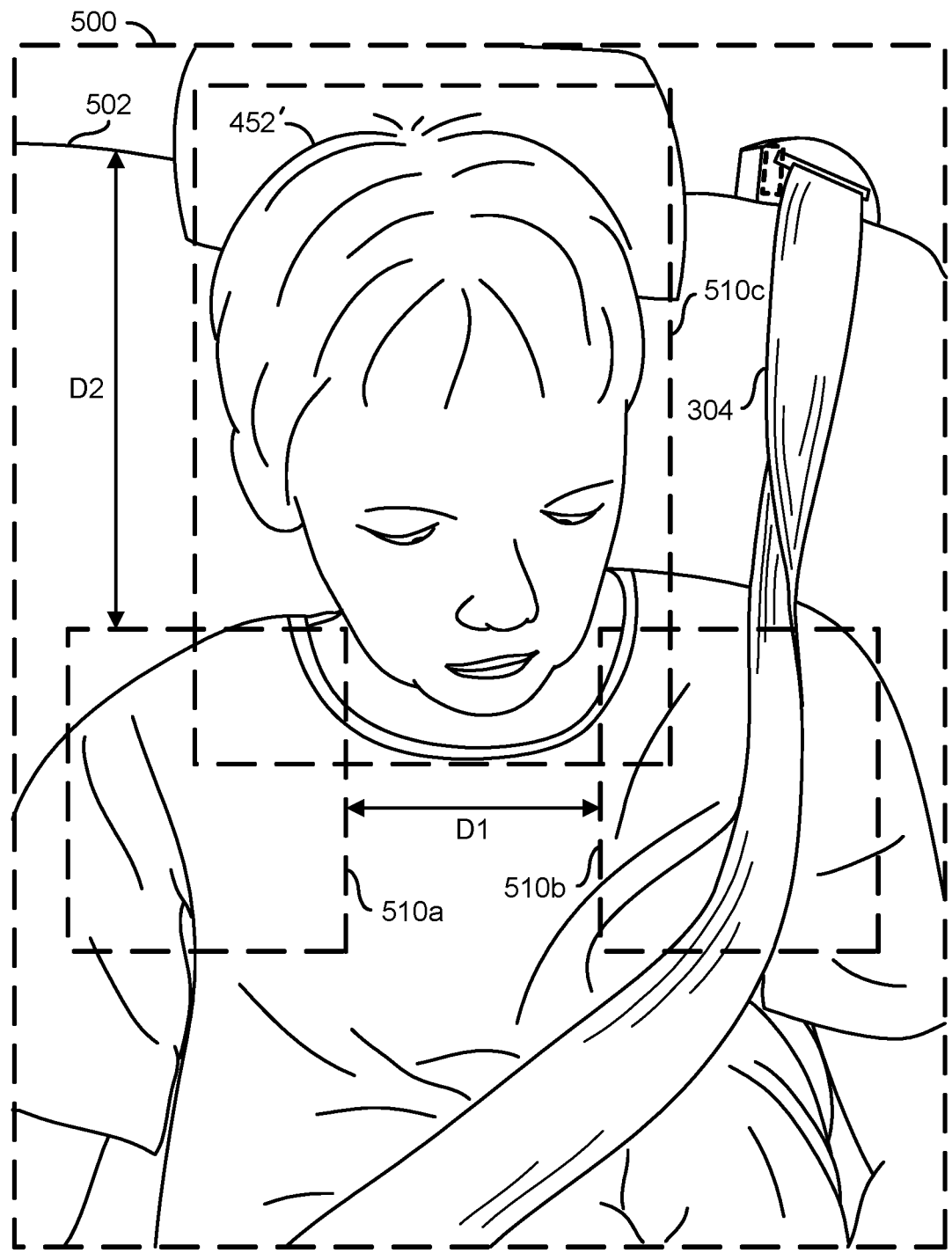
FIG. 8 is a diagram illustrating a processor determining characteristics of an occupant.

Referring to FIG. 8, a diagram illustrating the processors 106a-106n determining characteristics of an occupant is shown. An example video frame 500 is shown. The example video frame 500 may be one of the frames FRAMES_A-FRAMES_N captured using one of the capture devices 102a-102n directed at a seat 502 of the vehicle 50. The occupant 452' is shown in the seat 502. The seatbelt 304 is shown worn by the occupant 452'. In the example shown, one occupant 452' in one seat 502 is shown being analyzed using the computer vision operations. However, the apparatus 100 may be configured to detect numerous seats (e.g., seats 502a-502n, not shown), seatbelts (e.g., seatbelts 304a-304n, not shown) and/or occupants (e.g., occupants 452a-452n, not shown) for the entire interior of the vehicle 50. While only one occupant, seat and/or seatbelt may be shown for illustrative purposes, aspects of the invention 100 may be similarly applicable and/or performed for each of the seats 502a-502n, seatbelts 304a-304n and/or occupants 452a-452n.

The CNN module 150 may analyze the video frame 500 to determine the characteristics of the occupant 452'. Boxes 510a-510c are shown in the video frame 500 to represent various body parts of the occupant 452' that may be identified using computer vision. In the example shown in FIG. 8, three body parts (e.g., 510a-510c) are shown as identified by the CNN module 150 (e.g., for clarity). However, the CNN module 150 may identify and/or analyze numerous different body parts (e.g., 510a-510n, not shown). The body parts identified may be varied according to the design criteria of a particular implementation.

The body parts 510a-510n may be used by the processors 106a-106n to determine the characteristics of the occupant 452'. In the example shown, the body parts 510a-510c may be used to determine a size, orientation, position and/or location of the occupant 452' (e.g., relative to the interior of the vehicle 50 and/or relative to the seat 502). In the example shown, the processors 106a-106n may identify the shoulders 510a-510b of the occupant 452' and/or the head of the occupant 452'. In some embodiments, the computer vision operations may analyze individual body parts and/or the body as a whole.

In the example shown, the box 510a may represent a right shoulder of the occupant 452' and the box 510b may represent a left shoulder of the occupant 452'. The shoulders 510a-510b may represent characteristics of the occupant 452' that have been detected by the processors 106a-106n. A distance D1 is shown between the boxes representing the shoulders 510a-510b. The distance D1 may be used to determine the size and/or width of the occupant 452'. The distance D1 may be illustrative and the determination of the distance D1 may be more accurate than measurements to the boxes 510a-510b shown. For example, the processors 106a-106n may be configured to identify the body parts 510a-510b in the video frame 500 and measure a distance between the body parts 510a-510b. In an example, the distance D1 may be used to determine the characteristics of the occupant 452' to provide one potential source of information for determining an age and/or body size of the occupant 452'.

A distance D2 is shown between the shoulder 510a and the top of the seat 502. The distance D2 may be used to determine a size of the occupant 452' relative to the seat 502. The distance D2 may be illustrative and the determination of the distance D2 may be more accurate than measurements to the box 510a shown. In one example, the measurements may be performed at a pixel level. For example, the age and/or body size of the occupant 452' may be determined by the processors 106a-106n may be based on the location and/or height of the occupant 452' relative to the seat 502b. While one measurement (e.g., D2) is shown relative to the seat 502, numerous measurements (e.g., width of the body with respect to the seat 502, a distance from the head 510c to the headrest of the seat 502, a distance from the left shoulder 510b to the top of the seat 502, etc.) may be performed by the processors 106a-106n to determine an approximate age and/or body size of the occupant 452'.

The head 510c of the occupant 452' is shown. The CNN module may determine various characteristics of the head and/or face 510c of the occupant 452'. The size and/or shape of the detected face 510c may be compared to the size and/or shape of other faces (e.g., adults and/or children) by the CNN module 150 to approximate an age of the occupant 452'. Distances between and/or sizes of various facial features (e.g., eyes, nose, mouth, cheekbones, jaw, chin, eyebrows, forehead, ears, etc.) may be analyzed by the processors 106a-106n and/or compared with statistical data about facial features of people at particular ages. The analysis and/or comparisons performed by the processors 106a-106n may be used to approximate an age of the occupant 452' based on the computer vision operations. The types of analysis performed, the facial features analyzed, the comparisons made and/or the statistical information used for comparison may be varied according to the design criteria of a particular implementation.

In some embodiments, the overall size of the head 510c may be used to determine the age of the occupant 452'. In an example, the size of the head 510c may be compared to the overall size of the body of the occupant 452'. Generally, for a younger person the relative size of the head in proportion to the overall body size may be larger. For example, an adult may have a smaller head in proportion to the overall body size than a child. The processors 106a-106n may be configured to use the detected size of the head 510c as one factor for determining an approximate age of the occupant 452'.

In some embodiments, the processors 106a-106n may determine the age based on secondary sex characteristics.

For example, the detection of visible secondary sex characteristics using the computer vision operations may determine if the occupant 452' has reached puberty to help approximate the age (e.g., over the age of 12). In an example, the visible secondary sex characteristics may comprise detecting facial hair, detecting enlarged breasts, detecting widened hips, detecting an enlarged Adam's apple, etc. In another example, the computer vision operations may detect a baby bump indicating that the occupant 452' is pregnant (e.g., to help approximate the age).

The processors 106a-106n may determine the age of the occupant 452' based on an aggregation of various characteristics detected using the computer vision operations performed by the CNN module 150. Statistical weight may be adjusted for various characteristics. For example, a higher confidence level of an accurate detection of particular characteristic may have more statistical weight than a lower confidence level of accurate detection. In another example, particular characteristics may have a higher statistical weight (e.g., to account for particular factors that may provide a better indication of age such as the size of the head). The various factors and/or the statistical weights applied by the processors 106a-106n for each type of factor used for determining the age of the occupant 452' may be varied according to the design criteria of a particular implementation.

In some embodiments, the characteristics of the occupant 452' may comprise determining if the occupant 452' is above or below a threshold height for the seat 502. The processors 106a-106n may be configured to generate a reaction in response to comparing the determined characteristics of the occupant 452' and the threshold. The processors 106a-106n may generate the signal VCTRL to generate the reaction. In one example, the reaction implemented by the decision module 158 may be a notification that a child is too short to be seated in the seat 502 and/or that a booster seat should be installed. In another example, the reaction implemented by the decision module 158 may be a notification that a person is too young to be driving.

The decision module 158 may select an appropriate reaction in response to the characteristics of the occupant 452' (e.g., the age and/or size of the occupant 452') and/or the location of the seat 502 in the vehicle 50 determined as a result of the computer vision operations. The appropriate reaction may correspond to the scenario detected. In some embodiments, the appropriate reaction may comprise playing audio, activating or deactivating a warning light, presenting a message on an infotainment system (e.g., a touchscreen display), etc. In some embodiments, the appropriate reaction may comprise sending a notification to an owner of a vehicle (e.g., a text message sent to a smartphone, a phone call, an email, etc.). In some embodiments, the appropriate reaction may comprise sending a notification to the relevant authorities (e.g., police, child services, etc.). The number and/or types of reactions available for selection may be varied based on the design criteria of a particular implementation.

In one example, the CNN module 150 may detect the shoulders 510a-510b and/or analyze the features of the face 510c and the processors 106a-106n may calculate the size of the occupant 452' and/or approximate age of the occupant 452'. The processors 106a-106n may also determine a location of the seat 502 with respect to the interior of the vehicle 50. The decision module 158 may select the appropriate reaction based on the location of the seat 502 and/or the characteristics (e.g., age and/or size) of the occupant 452'. For example, each seat location may have a pre-defined threshold criteria (e.g., stored in the memory 108) for age and/or body size of the occupants 452a-452n. The reaction may be selected if the occupant in the particular seat does not meet the threshold.

Figure 9:
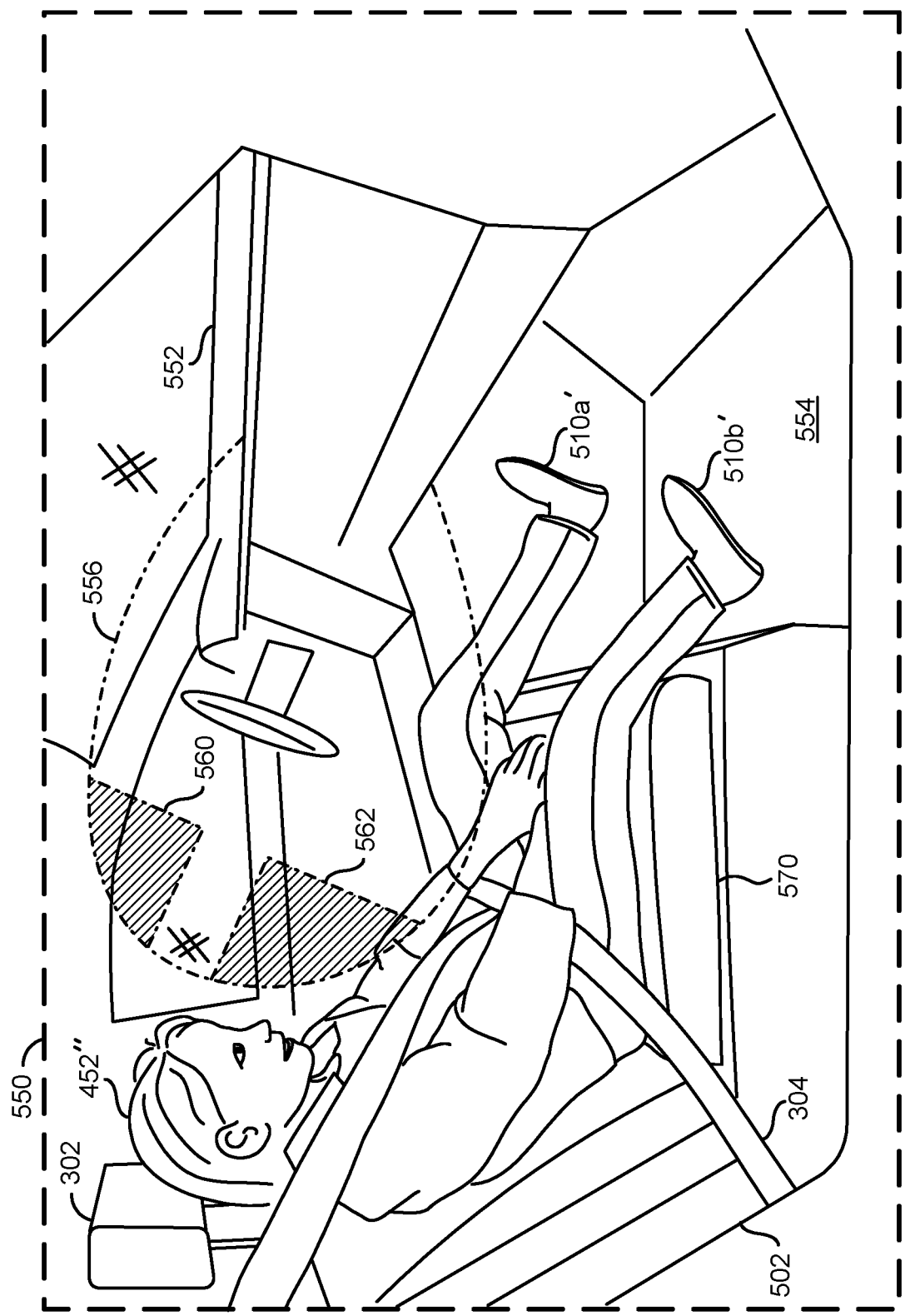
FIG. 9 is a diagram illustrating a processor determining a deployment zone for an air bag with respect to a passenger.

Referring to FIG. 9, a diagram illustrating the processors 106a-106n determining a deployment zone for an air bag with respect to a passenger is shown. An example video frame 550 is shown. The example video frame 550 may be one of the video frames captured by one of the capture devices 102a-102n. The example video frame 550 may comprise an interior view of the vehicle 50. The occupant 452" is shown. The occupant 452" may be seated in the seat 502. In the example shown, the seat 502 may be the passenger side seat.

A dashboard 552 of the vehicle 50 is shown. A passenger side leg area 554 is shown. A dotted line 556 is shown. The dotted line 556 may represent a potential deployment zone of a passenger side air bag. For example, if the vehicle 50 is in a collision, the passenger side air bag may be deployed and may fill the area indicated by the dotted line 556. The size and/or shape of the deployment zone 556 may be illustrative. The size and/or shape of the deployment zone 556 may be different based on a type of the vehicle 50, regulations and/or safety standards.

In the example video frame 550, the occupant 452" may be a child (e.g., under the age of 12). The child 452" is shown having legs 510a'-510b' that are not long enough to reach the floor of the leg area 554. The child 452" may not be tall enough for the headrest 302.

An area 560 and an area 562 are shown on the air bag deployment zone 556. The area 560 may represent a location on the deployed air bag that an adult in the passenger seat 502 may collide with. The area 562 may represent a location on the deployed air bag that the child 452" in the passenger seat 502 may collide with. For example, since an adult passenger may be taller, the adult may come into contact with the air bag 556 at the higher angle of the area 560. Since the air bag 556 may be deployed quickly and with a lot of force, the higher angle and greater distance from the seat 502 of the area 560 may result in the adult colliding with the air bag as intended (e.g., the force may be evenly distributed across more areas of the body). In another example, since the child 452" may be shorter, the child 452" may collide with the area 562 in the path of the deployment of the air bag 556. The force of the deployment of the air bag 556 may cause serious harm to the child 452" (e.g., the force may be concentrated at the head and neck of the child 452"). For example, colliding with the area 562 may cause the child 452" serious injury and/or death. The apparatus 100 may be configured to generate the reaction to help prevent the scenario where the child 452" is in the passenger seat 502. The area 560 and/or the area 562 may be illustrative and may not be indicative of how people contact air bags and/or of potential risks of air bags.

In some embodiments, the vehicle 50 may implement multiple air bags on the passenger side. In one example, the vehicle 50 may deploy an air bag out from the leg area 554 (e.g., with the intention to protect the legs of a passenger from colliding with the dashboard 552). The legs of an adult may reach the floor of the leg area 554 and an air bag deployment may contact the knees to provide protection. However, in the example shown, the legs 510a'-510b' of the child 452" do not reach the floor 554. An air bag deployed from the leg area 554 may cause serious injury to the extended legs 510a'-510b'. The computer vision operations performed by the CNN module 150 may detect the legs 510a'-510b' and the processors 106a-106n may determine that the legs 510*a*'-510*b*' do not reach the floor 554 and in response, the decision module 158 may initiate the reaction (e.g., prevent deployment of the lower air bags).

In some embodiments, the processors 106*a*-106*n* may predict the air bag deployment zone 556 and/or the movements of the child 452" in response to a collision. For example, fleet learning may be implemented in crash testing facilities on crash test vehicles. The CNN module 150 may analyze the pattern of movements of a crash test dummy having various body sizes and/or body proportions during multiple test crashes in many different types of vehicles and/or at different speeds and/or angles of collision. The processors 106*a*-106*n* may monitor information from the vehicle sensors 114 to determine a current speed of the vehicle 50. The processors 106*a*-106*n* may perform the computer vision operations based on video data captured by one or more of the capture devices 102*a*-102*n* providing an exterior view of the vehicle 50 in order to determine the location and/or angle of collision of objects that may potentially collide with the vehicle 50. Using the movement patterns from the detected using computer vision on the crash tests, the current speed of the vehicle 50 and/or the potential collision information (e.g., speed of oncoming vehicle, angle of collision, etc.), the processors 106*a*-106*n* may be configured to predict a movement of the child 452" caused by a potential collision. For example, the fleet learning may build up a large data set of potential body movements for collisions that may be used as a basis for predicting body movements of vehicle occupants in non-simulated collisions.

The processors 106*a*-106*n* may continually analyze the predicted movement of the child 452". The predicted movement of the child 452" may be compared to the air bag deployment area 556. If the predicted movement of the child 452" would result in a collision with the air bag that may not be recommended (e.g., the area 562), the processors 106*a*-106*n* may initiate the reaction.

In some embodiments, the processors 106*a*-106*n* may initiate the reaction in response to a detected age of the child 452". However, age may not always indicate whether or not the passenger should be seated in the seat 502. For example, a smaller or shorter adult may contact the area 562 when the air bag is deployed. The processors 106*a*-106*n* may perform the computer vision operations to detect the size of the body of the passenger 452" to determine whether the reaction should be initiated. Using the size of the body, the processors 106*a*-106*n* may determine the predicted movement of the body of the passenger 452" in response to a collision and/or compare the predicted movement to the air bag deployment zone 556.

The child 452" is shown seated on a booster seat 570. The booster seat 570 may increase the height of the child 452" relative to the seat 502. Increasing the height of the child 452" relative to the seat 502 may make the child appear taller but may not prevent potential injury caused by the air bag 556. For example, while the booster seat 570 may increase the height of the child 452", the legs 510*a*'-510*b*' may not reach the floor 554. The computer vision operations may be performed using multiple capture devices 102*a*-102*n* (e.g., the example video frame 550 may provide one angle capturing the child 452" used by the processors 106*a*-106*n* to determine the age and/or body size of the child 452"). Using multiple capture devices 102*a*-102*n* to capture various angles may provide more video data to accurately identify the characteristics of the child 452" and/or determine an appropriate reaction.

In some embodiments, the reaction selected by the processors 106*a*-106*n* may be to provide a warning. For example, the warning may be a visual warning on an infotainment system indicating that the child 452" should not be seated in the seat 502. In another example, the reaction selected by the processors 106*a*-106*n* may prevent operation of the vehicle 50 (e.g., the vehicle 50 may not be started until the child 452" is seated in another location). In some embodiments, the reaction selected by the processors 106*a*-106*n* may modify the deployment of the air bag 556. In one example, the reaction to modify the deployment of the air bag 556 may disable deployment of the air bag 556 (e.g., if the processors 106*a*-106*n* determine that more harm may be caused by the air bag 556 than not deploying the air bag 556). For example, the information learned from fleet learning may be used to determine whether the air bag 556 should be deployed. In another example, the reaction to modify the deployment of the air bag 556 may set a threshold speed for deploying the air bag 556 (e.g., in a low-speed collision the air bag 556 may cause injury even though the predicted body movement may indicate that the child 452" would not come into contact with the dashboard 552 in response to the low-speed collision). In yet another example, the reaction to modify the deployment of the air bag 556 may reduce a deployment speed or acceleration of the air bag 556 to reduce an amount of force generated by the deployment (e.g., reduce the deployment from the normal deployment speed of 125 mph). In still another example, the reaction to modify the deployment of the air bag 556 may reduce a volume of inflation. The reaction(s) implemented by the processors 106*a*-106*n* may be varied according to the design criteria of a particular implementation.

Figure 10:
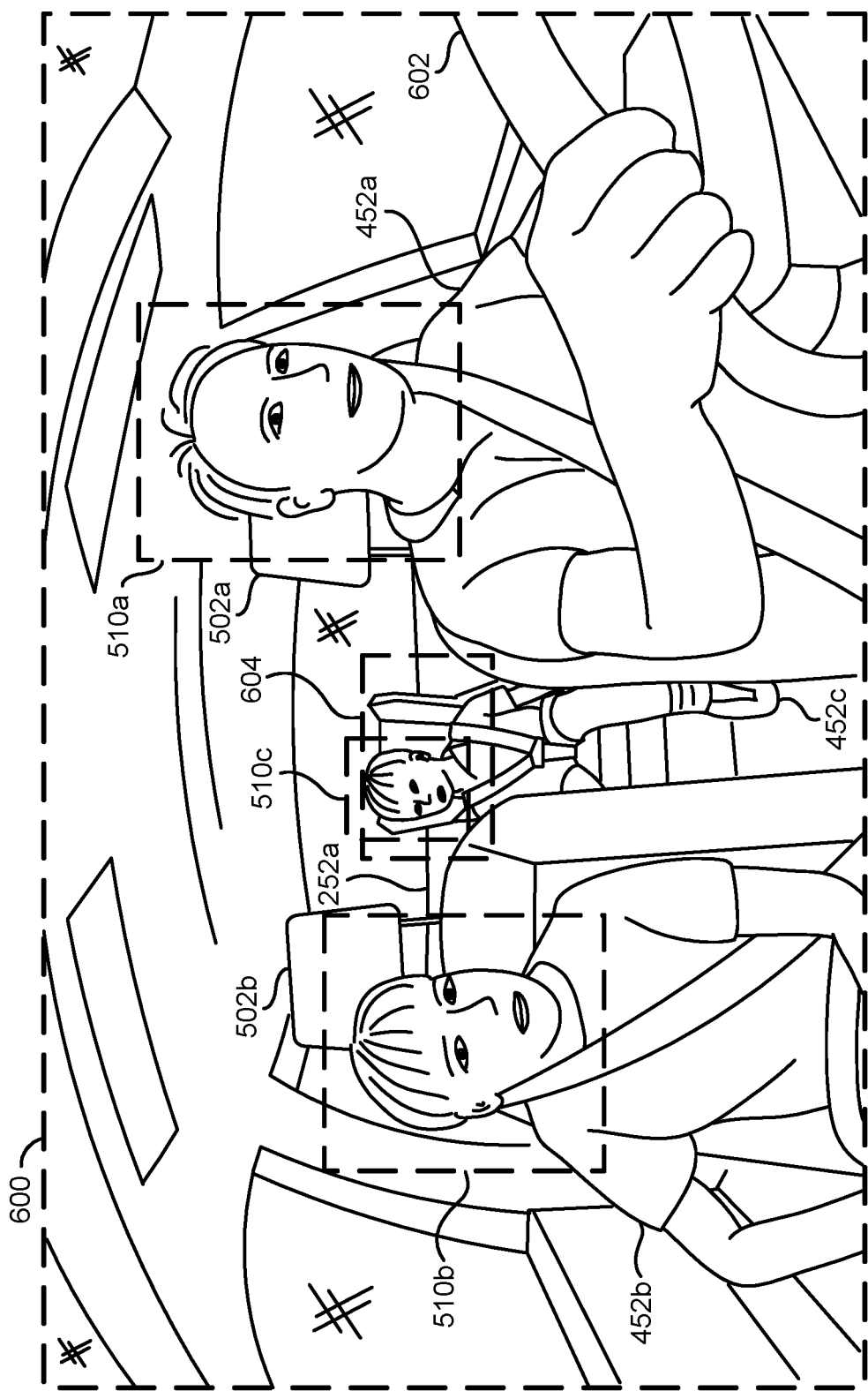
FIG. 10 is a diagram illustrating a processor analyzing characteristics of passengers in a vehicle cabin.

Referring to FIG. 10, a diagram illustrating the processors 106*a*-106*n* analyzing characteristics of passengers in a vehicle cabin is shown. A video frame 600 is shown. The video frame 600 may be a video frame captured by one or more of the capture devices 102*a*-102*n* of the interior of the vehicle 50. In one example, the lens 112*a* of the capture device 102*a* may implement a wide angle lens configured to capture a wide angle field of view of the interior of the vehicle 50. For example, the processors 106*a*-106*n* may be configured to perform video de-warping operations on potential distortions caused by the wide angle lens 112*a* before performing the computer vision operations. In another example, the video frame 600 may be created by stitching together video frames captured at the same time by more than one of the capture devices 102*a*-102*n*. For example, the processors 106*a*-106*n* may be configured to perform video stitching operations to combine multiple video frames together in order to generate the video frame 600 before performing the computer vision operations. Capturing a wide angle view and/or generate a stitched view of the interior of the vehicle 50 may enable the processors 106*a*-106*n* to analyze a view showing more than one of the occupants 452*a*-452*n* of the vehicle 50. The method of capturing the wide angle video frame 600 may be varied according to the design criteria of a particular implementation.

In the example video frame 600, a number of occupants 452*a*-452*c* are shown. For example, the driver 452*a* is shown in the driver seat 502*a*, the passenger 452*b* is shown in the passenger seat 502*b* and the occupant 452*c* is shown in a seat in the back row 252*a* (e.g., a bench seat). The CNN module 150 may be configured to detect various objects in the video frame 600. In an example, the computer vision operations may detect a steering wheel 602 (or other features of the interior of the vehicle 50). In another example, the computer vision operations may detect the driver seat 502a, the passenger seat 502b and/or the back row bench seat 252a.

The boxes 510a-510c are shown. The boxes 510a-510c may be a detected object and/or group of objects representing faces and/or heads detected by the processors 106a-106n. For example, the face 510a may correspond to the occupant 452a, the face 510b may correspond to the occupant 452b and the face 510c may correspond to the occupant 452c. A box 604 is shown. The box 604 may correspond to a child safety seat detected by the processors 106a-106n.

The processors 106a-106n may be configured to determine the age of the occupants 452a-452c based on the faces 510a-510c (e.g., facial features) and/or other characteristics of the occupants 452a-452c determined by the CNN module 150 (e.g., a body size, body proportions, etc.). The processors 106a-106n may be configured to determine a location of the seats 502a-502b and/or the bench seat 252a. The processors 106a-106n may be configured to determine the location of the occupants 452a-452c within the cabin of the vehicle 50. In one example, 3D co-ordinates of the body of the occupants 452a-452c may be determined (e.g., by determining a horizontal co-ordinate, a vertical co-ordinate and/or a depth co-ordinate for each occupant 452a-452n with respect to the lens 112a of the capture device 102a). In another example, various objects within the vehicle 50 may be used to provide a location of the occupants 452a-452c (e.g., a location of the seats 502a-502b and/or the bench 252a, a location of the steering wheel 602, distance from the windows and/or side panels, etc.). In yet another example, the sensor fusion module 152 may be configured to analyze input from the vehicle sensors 114 to perform sensor fusion operations (e.g., cross-reference a location determined based on the computer vision operations with weight sensors located in the seats 502a-502b and/or the bench 252a, perform a comparison based on LIDAR, perform a comparison based on radar detection, etc.). Based on the characteristics of the occupants 452a-452c, the locations of the occupants 452a-452c and/or the locations of the seats 502a-502b and/or the bench 252a, the processors 106a-106n may determine whether a reaction should be performed.

In the example video frame 600, the occupant 452a may be an adult driver. The computer vision operations may determine that the face 510a has characteristics corresponding to an adult male (e.g., adult facial features). The computer vision operations may further determine that the body of the occupant 452a is the body of an adult male (e.g., the body is tall relative to the seat 502a, the head 510a reaches the headrest of the seat 502a, the arms are not reaching up to touch the steering wheel 602, the size of the head 510a is small in proportion to the body, etc.). The processors 106a-106n may perform the computer vision operations to detect the location of the seat 502a (e.g., detect the driver seat in the front row). In some embodiments, the locations of the seats may be pre-defined information stored in the memory 108 (e.g., based on location co-ordinates relative to the location of the capture device 102a). The processor 106a-106n may compare the determined characteristics of the occupant 452a with the threshold for the driver seat 502a (e.g., a person over the age of 16). Since the driver 452a is an adult male (e.g., over the age of 18), the driver 452a may meet the criteria of the threshold for the driver seat 502a. The decision module 158 may determine an appropriate reaction (e.g., no reaction/do nothing).

In the example video frame 600, the occupant 452b may be a child passenger. The computer vision operations may determine that the face 510b has characteristics corresponding to a child (e.g., pre-teen facial features). The computer vision operations may further determine that the body of the occupant 452b is the body of a young male below the age of 12 (e.g., the body is small relative to the seat 502b, the head 510b does not reach the headrest of the seat 502b, the size of the head 510b is large in proportion to the body, etc.). The processors 106a-106n may perform the computer vision operations to detect the location of the seat 502b (e.g., detect the passenger seat in the front row). The processor 106a-106n may compare the determined characteristics of the occupant 452b with the threshold for the driver seat 502b (e.g., a person over the age of 12). Since the passenger 452b is child (e.g., under the age of 12), the passenger 452b may not meet the criteria of the threshold for the passenger seat 502b. The decision module 158 may determine an appropriate reaction (e.g., play an audio warning, modify the deployment of the air bag 556, display a warning on the infotainment system, etc.).

In the example video frame 600, the occupant 452c may be a toddler. The computer vision operations may determine that the face 510c has characteristics corresponding to a toddler and/or a baby (e.g., very young facial features). The computer vision operations may further determine that the body of the occupant 452c is the body of an infant male below the age of 6 (e.g., the body is small relative to the seat 252a, the size of the head 510c is very large in proportion to the body, the feet of the occupant 452c do not reach the floor, etc.). The processors 106a-106n may perform the computer vision operations to detect the location of the seat 252a (e.g., detect the seat as a bench for the back row 252a). The processor 106a-106n may compare the determined characteristics of the occupant 452c with the threshold for the back seat bench 252a (e.g., a person over the age of 12). Since the passenger 452c is an infant (e.g., under the age of 12), the passenger 452c may not meet the criteria of the threshold for the reach bench 252a. However, the computer vision operations may detect the child safety seat 604. For example, for a child under the age of 6, the threshold criteria for the back seat bench 252a may provide an exception for a child safety seat. Various criteria for the child safety seat 604 may be checked (e.g., size, orientation, whether the restraints are connected, etc.). For example, for a baby, the correct orientation for the safety seat 604 may be backwards (e.g., not facing the front of the vehicle 50). Since the occupant 452c is not a baby, a front facing child safety seat 604 may meet the threshold criteria. Since the child safety seat 604 is installed correctly, the decision module 158 may determine that the reaction of a warning may not be needed (e.g., a null reaction may be the appropriate reaction).

The processors 106a-106n may be configured to determine the approximate age of the occupants 452a-452n and/or an associated confidence level indicating the determination of the age. The confidence level may represent a likelihood that the age determined is correct. In some scenarios, the age of the occupants 452a-452c may be difficult to determine and/or the age of the occupants 452a-452c may be close to the threshold for the particular seats 502a-502b and/or the bench 252a. For example, the child 452b may appear to be approximately 12 years old (e.g., right at the threshold age). In another example, the child 452b may be 14 years old but have a younger appearance. In still another example, the child 452b may be 11 years old but appear older than 12. When the age is difficult to determine with respect to the threshold age, the processors 106a-106n may perform reversible and/or easily correctable reactions. For example, performing the notification on the infotainment touchscreen display of the vehicle 50 may be non-intrusive, and may provide useful information in the case that the passenger 452b is younger than 12 and may be easily ignored if the passenger 452b is older than 12. In another example, modifying the deployment of the air bag 556 to not deploy may be a reaction with greater consequences if the decision is incorrect. For example, modifying the deployment of the air bag 556 may cause harm if the passenger 452b is actually older than 12 and not modifying the air bag 556 may cause harm if the child is actually younger than 12. Modifying the air bag 556 may not be the appropriate reaction if the processors 106a-106n are not able to determine the age of the passenger 452b with a sufficient level of confidence.

In some embodiments, the processors 106a-106n may implement graduated and/or dependent reactions. For example, if the child 452b is determined to be approximately 12 years old, the reaction selected by the processors 106a-106n may be to provide a prompt on the infotainment system touchscreen display that asks if the passenger 452b is 12 years old or younger. One of the occupants 452a-452c may respond to the prompt and the processors 106a-106n may perform the dependent reaction based on the response to the prompt. For example, if one of the occupants 452a-452c confirm that the age of the occupant 452b is younger than 12 years old, then the dependent reaction may be performed to modify the deployment of the air bag 556.

In some embodiments, the processors 106a-106n may select the reaction in response to the overall body size and/or body dimensions instead of age. For example, the threshold for the seats 502a-502b and/or the bench 252a may be a body size and/or an age. For example, an adult may be smaller than the recommended body size for the deployment of the air bag 556 (e.g., age may not be indicative of body size). Generally, the processors 106a-106n may determine the characteristics (e.g., the body size, the age, etc.) based on the threshold criteria. In one example, the threshold criteria for body size of the passenger seat 502b may be a minimum height of 140 cm. The threshold criteria may be changed and/or updated. For example, the threshold criteria may be stored by the memory 108 of the apparatus 100. The memory 108 may be updated with additional threshold criteria and/or may be updated to replace existing threshold criteria. For example, the threshold criteria in the memory 108 may be updated as new safety regulations and/or laws are introduced and/or as safety studies are performed.

Figure 11:
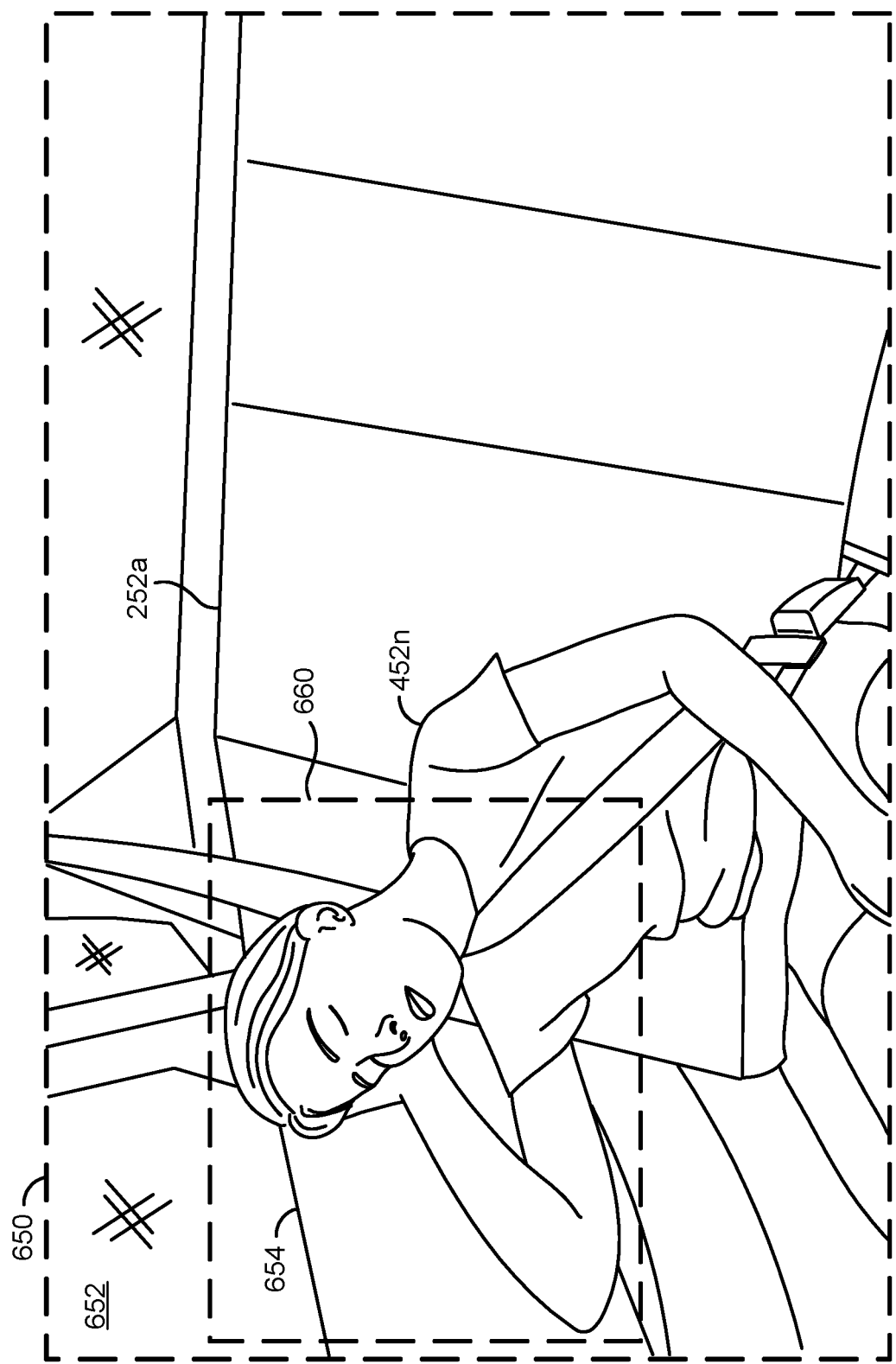
FIG. 11 is a diagram illustrating a processor detecting a potentially risky scenario.

Referring to FIG. 11, a diagram illustrating the processors 106a-106n detecting a potentially risky scenario is shown. An example video frame 650 is shown. The example video frame 650 may be a view of the back bench 252a in the interior of the vehicle 50 captured by one or more of the capture devices 102a-102n. The occupant 452n is shown on the back bench 252a.

A side window 652 is shown in the example video frame 650. A side door panel 654 is shown in the example video frame 650. The side window 652 and/or the side door panel 654 may correspond to a rear passenger door (e.g., of a sedan model vehicle 50). The occupant 452n is shown leaning on the side window 652 and/or the side door panel 654.

A box 660 is shown. The box 660 may represent an object and/or group of objects detected by the CNN module 150. In the example video frame 650, the group of objects detected by the processors 106a-106n may correspond to the occupant 452n resting on the side door panel 654. The processors 106a-106n may perform the computer vision operations and determine a relationship between various objects. For example, one object may be the occupant 452n and another object may be the door panel 654. The processors 106a-106n may recognize sub-objects of the occupant 452n (e.g., arms, head, chest, shoulders, etc.). The processors 106a-106n may detect that the arm of the occupant 452n is in contact with the door panel 654. The processors 106a-106n may detect that the head of the occupant 452n is in contact with the door panel 654. The processors 106a-106n may analyze the various object to determine that the relationship between the objects indicates that the occupant 452n is resting on the door panel 654.

In some embodiments, the threshold criteria corresponding to the seats 502a-502n and/or the bench seat 252a may define relationships between objects. For example, the threshold criteria may comprise a restriction against resting body parts on particular components of the interior of the vehicle 50. For example, the threshold criteria may define a restriction of a relationship between objects that indicates that one of the occupants 452a-452n has feet resting on the dashboard. In another example, the threshold criteria may define a restriction of a relationship between objects that indicates that one of the occupants 452a-452n is resting against a door panel and/or a window. The type of relationships between objects that may be restricted according to the threshold criteria may be varied according to the design criteria of a particular implementation.

Generally, a person and/or a child resting against the side of the vehicle 50 may be a potential safety risk. For example, when side air bags are deployed, a person resting against the side of the interior of the vehicle 50 may be pushed forcefully by the deployment of the side air bags. Children may be at greater risk. The processors 106a-106n may be configured to perform the computer vision operations to detect the relationship between the occupant 452n and the window 652 and/or the door panel 654. In the example video frame 650, the processors 106a-106n may detect that the occupant 452n is resting against the door panel 654. The threshold criteria for the back bench seat 252a may have a restriction against resting on the door panel 654. The processors 106a-106n may compare the video data corresponding to the example video frame 650 to the threshold criteria. Since the video data does not comply with the threshold criteria, the processors 106a-106n may select an appropriate reaction. For example, since the child 452n may be sleeping, the reaction selected may be an audible warning (e.g., to wake the child, which may cause the child 452n to move off of the door panel 654). In some embodiments, the audio warning may be customized for the particular scenario. For example, the audio warning may be a spoken message (e.g., pre-recorded and/or procedurally generated) instructing the child 452n to move away from the door panel 654.

In some embodiments, the apparatus 100 may implement multiple camera angles in order to aggregate video data to make the determination of the age of the occupants 452a-452n and/or the relationship between the occupants 452a-452n and the components of the vehicle 50. In one example, one camera (e.g., one of the capture devices 102a-102n) may provide a wide angle view of the interior (e.g., as shown in association with FIG. 10) and another camera may provide a directed view of the occupant 452n (e.g., as shown in association with FIG. 11). Capturing video frames from multiple angles may provide a richer data set for the computer vision operations. The processors 106a-106n may be configured to combine the information from the various angles to increase and/or decrease a confidence level about various objects that have been detected. In one example, a profile view of one of the occupants (e.g., an occupant 452i) may be obscured by a hand of the occupant 452i, which may make a determination of age difficult. However, a front view may provide video data that may be used to determine age. The number of camera angles captured may be varied according to the design criteria of a particular implementation.

Figure 12:
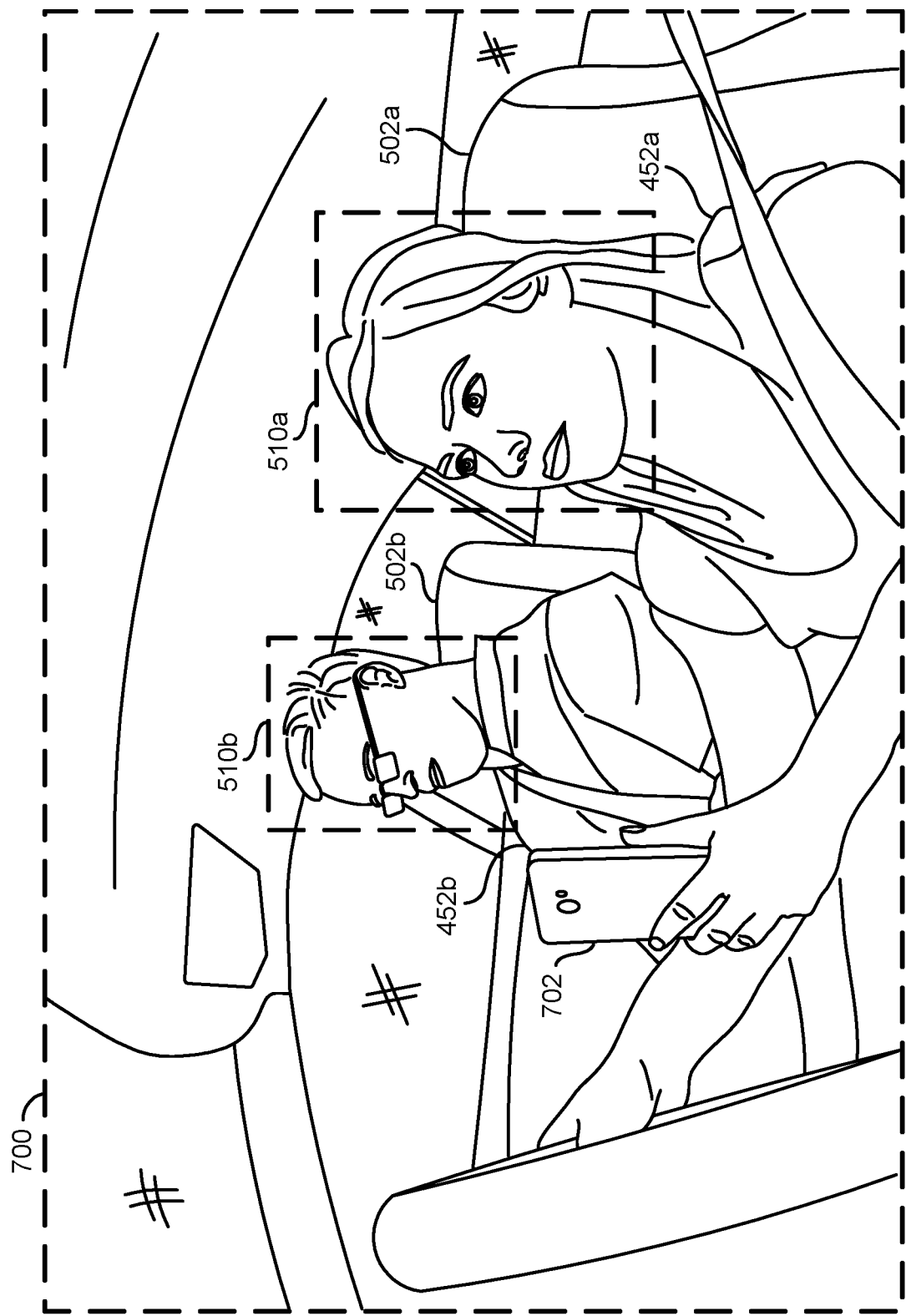
FIG. 12 is a diagram illustrating a processor detecting a young driver and an adult passenger.

Referring to FIG. 12, a diagram illustrating the processors 106a-106n detecting a young driver and an adult passenger is shown. An example video frame 700 is shown. The example video frame 700 may be a video frame of the interior of the vehicle 50 captured by one of the capture devices 102a-102n. The example video frame 700 may be a video frame capturing a front row of seats of the interior of the vehicle 50.

Occupants 452a-452b are shown in the video frame 700. The seats 502a-502b are shown in the video frame 700. The occupant 452a may be in the driver seat 502a. The occupant 452b may be in the passenger seat 502b.

Boxes 510a-510b may represent the faces detected by the processors 106a-106n. The face 510a may be the face of the driver 452a. The face 510b may be the face of the passenger 452b. The processors 106a-106n may further detect the seats 502a-502b. The processors 106a-106n may detect that the face 510a corresponds to the occupant 452a located in the driver seat 502a. The processors 106a-106n may detect that the face 510b corresponds to the occupant 452b located in the passenger seat 502b. The driver 452a is shown holding a smartphone 702. The CNN module 150 may be configured to detect and/or classify the object 702 as a smartphone.

The processors 106a-106n may be configured to determine an age of the occupants 452a-452b. For example, the face 510a and/or other characteristics may indicate that the driver 452a is a young female driver approximately 16 years of age. In some embodiments, the sensors 114 may provide a GPS/GNSS co-ordinate location and the processors 106a-106n may check the memory 108 for information corresponding to local laws and/or regulations to determine a minimum driving age for the threshold criteria. The threshold age for the driver seat 502a may be determined according to the determined local laws and/or regulations. For example, many US states have a minimum driving age of 16. In another example, some countries have a minimum driving age of 18. In yet another example, some jurisdictions have graduated licensing that allows one age range to drive with adult supervision and a second age range to drive without restrictions. In some embodiments, the threshold age for the driver seat 502a may be the same regardless of the location.

The decision module 158 may determine a reaction according to the age of the driver 452a. In one example, if the driver 452a is determined to be old enough to be driving, the decision module 158 may select no reaction. In another example, if the driver 452a is determined to be too young to drive, the decision module 158 may select and/or initiate the reaction of sending a notification to the owner of the vehicle 50. In one example, the notification may be sent as an SMS text message. In another example, the notification may be sent as a message compatible with a smartphone (e.g., the smartphone 702). In yet another example, the notification may be sent as an email. The notification may comprise a message informing the owner of the vehicle 50 that an underage person (e.g., a person that is too young to drive) may be operating the vehicle 50. The type and/or contents of the notification reaction may be varied according to the design criteria of a particular implementation.

In some embodiments, the processors 106a-106n may detect the age of the driver 452a and the passenger 452b. For example, the CNN module 150 may determine the characteristics of the face 510b and the processors 106a-106n may determine that the passenger 452b is an adult. In some embodiments, the processors 106a-106n may select no reaction (e.g., suppress the reaction) if the passenger 452b is an adult. For example, in locations that have graduated licensing and/or allow a young driver to operate the vehicle 50 with adult supervision, the age of the passenger 452b may be part of the threshold criteria. For example, a parent may not want to receive a text message notification if the young driver 452a is with a driving instructor in the passenger seat. The processors 106a-106n may determine whether the age of the driver 452a is within the threshold criteria and then check whether the age of the passenger 452b is within the threshold criteria. If the passenger 452b is also too young, the decision module 158 may initiate the reaction to notify the owner of the vehicle 50 (e.g., teenagers may have taken the vehicle 50 for a joyride).

The driver 452a is shown holding the smartphone 702. Texting and driving and/or distracted driving is known to be very dangerous. The CNN module 150 may be configured to detect the smartphone 702 and the processors 106a-106n may determine that the driver 452a is holding a smartphone while driving. The processors 106a-106n may perform the reaction in response to the detected smartphone 702 being held by the driver 452a. For example, parents may want to know that a child is texting and driving. However, some locations may allow a phone mount to be used (e.g., hands free usage of the smartphone 702). Whether the smartphone 702 may be used as a hands-free device with a phone mount may be part of the threshold criteria that may be determined based on the location of the vehicle 50.

In the example video frame 700, the object 702 may be shown as a smartphone held by the driver 452a. However, the processors 106a-106n may be configured to identify and/or classify other similar objects (e.g., music players, portable video game consoles, toys for children, water bottles, etc.). The processors 106a-106n may be configured to determine which of the occupants 452a-452n is holding the detected object 702. In one example, the driver holding the smartphone 702 may not only be dangerous because of distracted driving but also because if the air bag 556 is deployed, the inflation of the air bag 556 may force the smartphone 702 into the face 510a of the driver 452a, which may result in injury. Furthermore, many children (e.g., occupants 452a-452n that may not be driving) use portable video game consoles in the vehicle 50. The force of the inflation of other air bags for other occupants may also result in injury (e.g., pushing the handheld video game console into the face as the air bags are deployed). The decision module 158 may initiate the reaction in response to various objects (e.g., smartphones, handheld video game consoles, etc.) that are held up to the face of the occupants. For example, the reaction may be a notification and/or an audible warning to tell the occupants to lower the portable video game console to waist-level instead of holding the portable console up to face-level.

Figure 13:
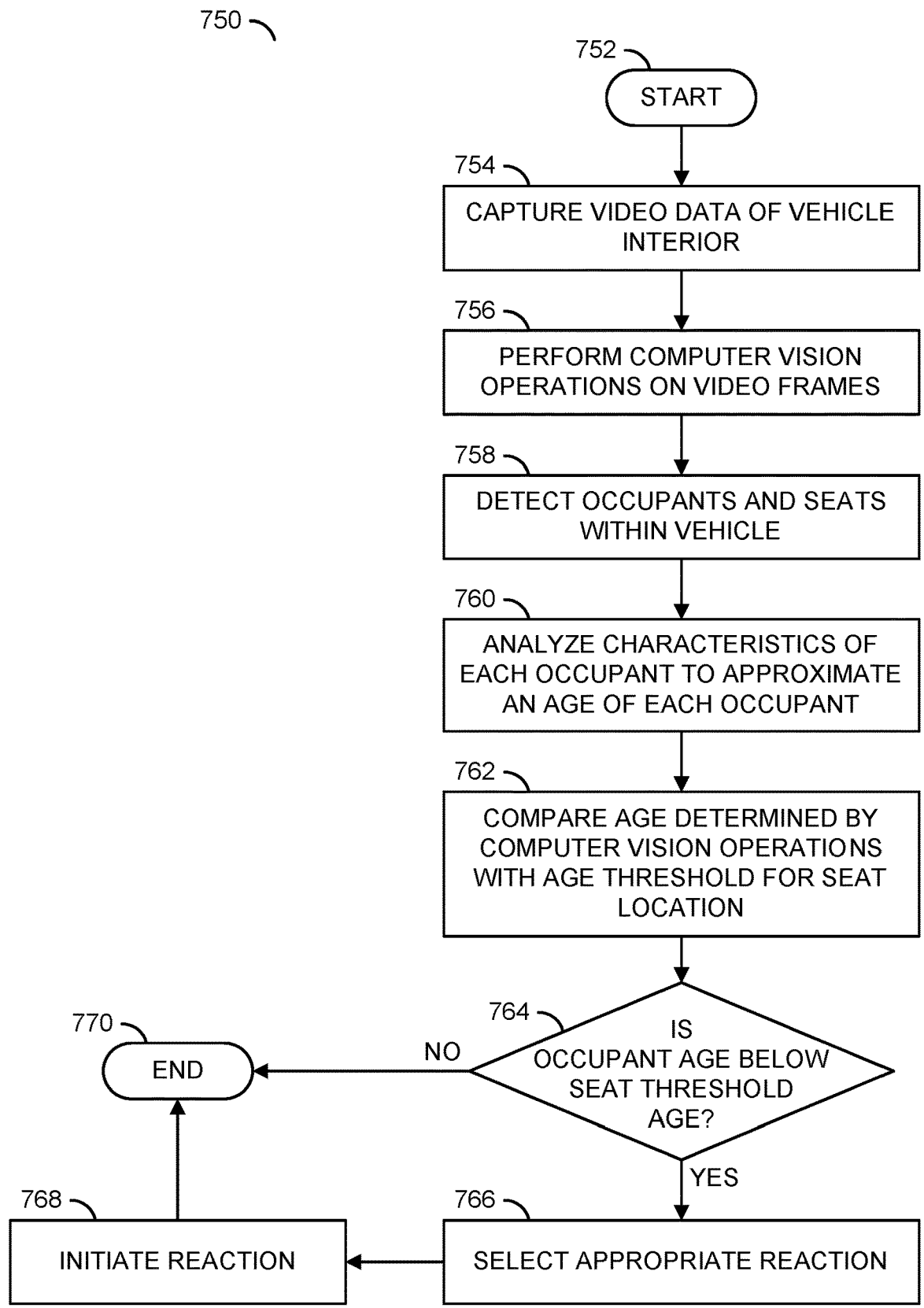
FIG. 13 is a flow diagram illustrating a method for performing a reaction in response to a detected age of an occupant.

Referring to FIG. 13, a method (or process) 750 is shown. The method 750 may perform a reaction in response to a detected age of an occupant. The method 750 generally comprises a step (or state) 752, a step (or state) 754, a step (or state) 756, a step (or state) 758, a step (or state) 760, a step (or state) 762, a decision step (or state) 764, a step (or state) 766, a step (or state) 768, and a step (or state) 770.

The step 752 may start the method 750. Next, in the step 754, the capture devices 102a-102n may capture video data of the interior of the vehicle 50. In the step 756, the processors 106a-106n and/or the CNN module 150 may perform the computer vision operations on the video frames (e.g., video data corresponding to the signals FRAMES_A-

FRAMES_N). Next, in the step 758, the processors 106a-106n may detect the occupants 452a-452n and/or the seats 502a-502n within the vehicle 50. Next, the method 750 may move to the step 760.

In the step 760, the processors 106a-106n may analyze the characteristics (e.g., analyze the corresponding faces 510a-510n and/or bodies) of each of the occupants 452a-452n to approximate the age of each occupant. Next, in the step 762, the processors 106a-106n may compare the age of the occupants 452a-452n determined by the computer vision operations with the age threshold corresponding to each seat location. For example the threshold for each of the seats 502a-502n may be stored by the memory 108. Next, the method 750 may move to the decision step 764.

In the decision step 764, the processors 106a-106n may determine whether the ages of the occupants 452a-452n are below the threshold age for the corresponding seats 502a-502n. If not, the method 750 may move to the step 770. If the determined age of at least one of the occupants 452a-452n is below the age threshold for the corresponding one of the seats 502a-502n, then the method 750 may move to the step 766. In the step 766, the decision module 158 may select the appropriate reaction (e.g., an audible tone, a message, a modification to the deployment of the air bag 556, etc.). Next, in the step 768, the processors 106a-106n may initiate the reaction. The reaction may be initiated by presenting the signal VCTRL to the interface 104. The interface 104 may generate one or more of the signals VCTRL' for the actuators 116 that may perform the reaction. Next, the method 750 may move to the step 770. The step 770 may end the method 750.

Figure 14:
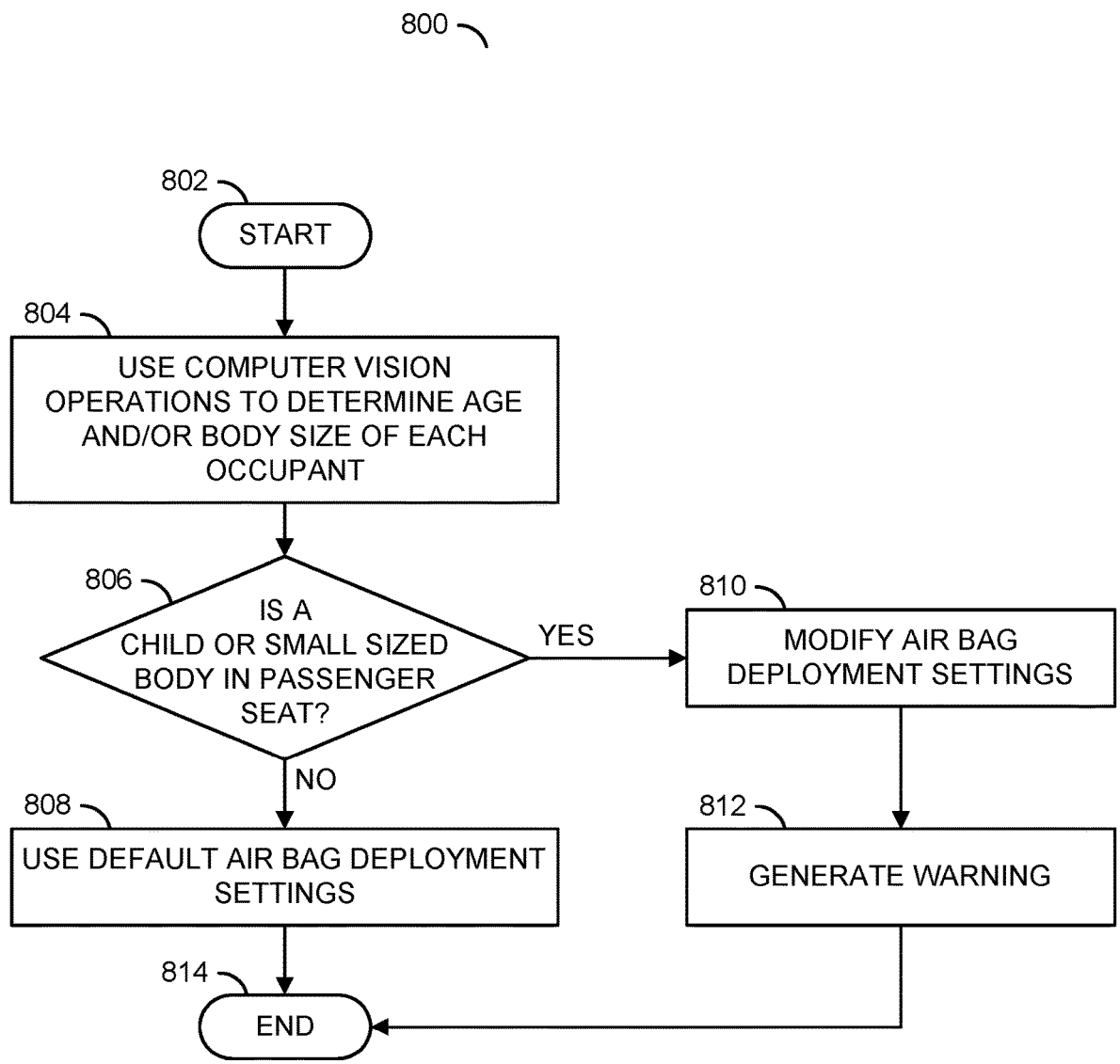
FIG. 14 is a flow diagram illustrating a method for modifying an air bag deployment in response to an age and/or body size of an occupant.

Referring to FIG. 14, a method (or process) 800 is shown. The method 800 may modify an air bag deployment in response to an age and/or body size of an occupant. The method 800 generally comprises a step (or state) 802, a step (or state) 804, a decision step (or state) 806, a step (or state) 808, a step (or state) 810, a step (or state) 812, and a step (or state) 814.

The step 802 may start the method 800. In the step 804, the processors 106a-106n may use the computer vision operations to determine the age and/or body size (e.g., the characteristics) of each of the occupants 452a-452n. Next, the method 800 may move to the decision step 806.

In the decision step 806, the processors 106a-106n may determine whether a child (e.g., the child 452" shown in association with FIG. 9) and/or a small sized body (e.g., less than 140 cm in height) is in the passenger seat 502b. If the occupant 452" is not a child and/or a small sized person, the method 800 may move to the step 808. In the step 808, the processors 106a-106n may select the default deployment settings for the air bag 556 (e.g., no change may be made and/or the processors 106a-106n may provide the signal VCTRL to select the default settings). Next, the method 800 may move to the step 814.

In the decision step 806, if the occupant 452" is determined to be a child and/or has a small sized body, the method 800 may move to the step 810. In the step 810, the processors 106a-106n may modify the deployment settings of the air bag 556. Next, in the step 812, the processors 106a-106n may generate a warning. For example, the deployment settings of the air bag 556 may be modified to reduce an amount of acceleration of the air bag deployment, reduce an inflation speed, reduce a volume of the air bag, etc. The deployment settings may be modified first to ensure safety and then the warning may be generated to indicate that the settings have been modified and/or provide a recommendation that the occupant is moved to another seat in the vehicle 50 (e.g., a seat that the occupant would meet the threshold criteria). The warning and/or the modification of the air bag deployment settings may be performed by the actuators 116 in response to the signal VCTRL and/or VCTRL'. Next, the method 800 may move to the step 814. The step 814 may end the method 800.

Referring to FIG. 15, a method (or process) 850 is shown. The method 850 may analyze the age of a passenger in response to a determined age of a driver. The method 850 generally comprises a step (or state) 852, a step (or state) 854, a step (or state) 856, a decision step (or state) 858, a decision step (or state) 860, a decision step (or state) 862, a step (or state) 864, a decision step (or state) 866, a step (or state) 868, and a step (or state) 870.

The step 852 may start the method 850. In the step 854, the processors 106a-106n may perform the computer vision operations on the occupant 452a in the driver seat 502a. Next, in the step 856, the processors 106a-106n may determine the age of the driver 452a based on the characteristics determined by the computer vision operations. Next, the method 850 may move to the decision step 858.

In the decision step 858, the processors 106a-106n may determine whether or not the driver 452a is too young to drive the vehicle 50. For example, if the location of the vehicle 50 is in a jurisdiction where the age of 16 is the lower age limit for driving, the processors 106a-106n may determine whether or not the driver 452a is younger than 16. If the driver is too young to drive, the method 850 may move to the step 868. If the driver is not too young to drive, the method 850 may move to the decision step 860.

In the decision step 860, the processors 106a-106n may determine whether the driver 452a is too young to drive alone. For example, if the location of the vehicle 50 is in a jurisdiction where the age 16 is the lower limit for driving and anyone between the ages of 16-18 must be accompanied by an adult, the processors 106a-106n may determine whether or not the driver 452a is younger than 18 years old. If the driver 452a is not too young to drive alone (e.g., over 18 years old), the method 850 may move to the step 870 (e.g., no reaction may be selected). If the driver 452a is too young to drive alone, the method 850 may move to the decision step 862.

In the decision step 862, the processors 106a-106n may perform the computer vision operations to determine whether there is an occupant (e.g., the occupant 452b) in the passenger seat 502b. For example, when the driver 452a must be accompanied by an adult, the processors 106a-106n may check the passenger seat 502b to determine whether an adult is present. If there is no passenger 452b detected, the method 850 may move to the step 868. If the passenger 452b is detected, the method 850 may move to the step 864. In the step 864, the processors 106a-106n may determine the age of the occupant 452b in the passenger seat 502b (e.g., the computer vision operations may be performed and/or the characteristics of the occupant 452b may be analyzed). Next, the method 850 may move to the decision step 866.

In the decision step 866, the processors 106a-106n may determine whether the passenger 452b is too young. For example, if the location of the vehicle 50 is in a jurisdiction that requires an adult be present with a young driver, the threshold criteria for the occupant 452b of the passenger seat 502b may be 18 years of age. If the passenger is not too young (e.g., no reaction may be selected by the processors 106a-106n), the method 850 may move to the step 870. If the passenger is too young (e.g., a 16 year old is driving with a friend that is also 16 years old), the method 850 may move to the step 868.

In the step 868, the processors 106a-106n may select the response to notify the owner of the vehicle 50. For example, contact information for the vehicle owner may be stored in the memory 108. In an example, the signal VCTRL may be generated by the processors 106a-106n to initiate a communication with a smartphone of the owner of the vehicle 50 to provide a text message indicating that a person too young to be driving has been detected. Next, the method 850 may move to the step 870. The step 870 may end the method 850.

Figure 16:
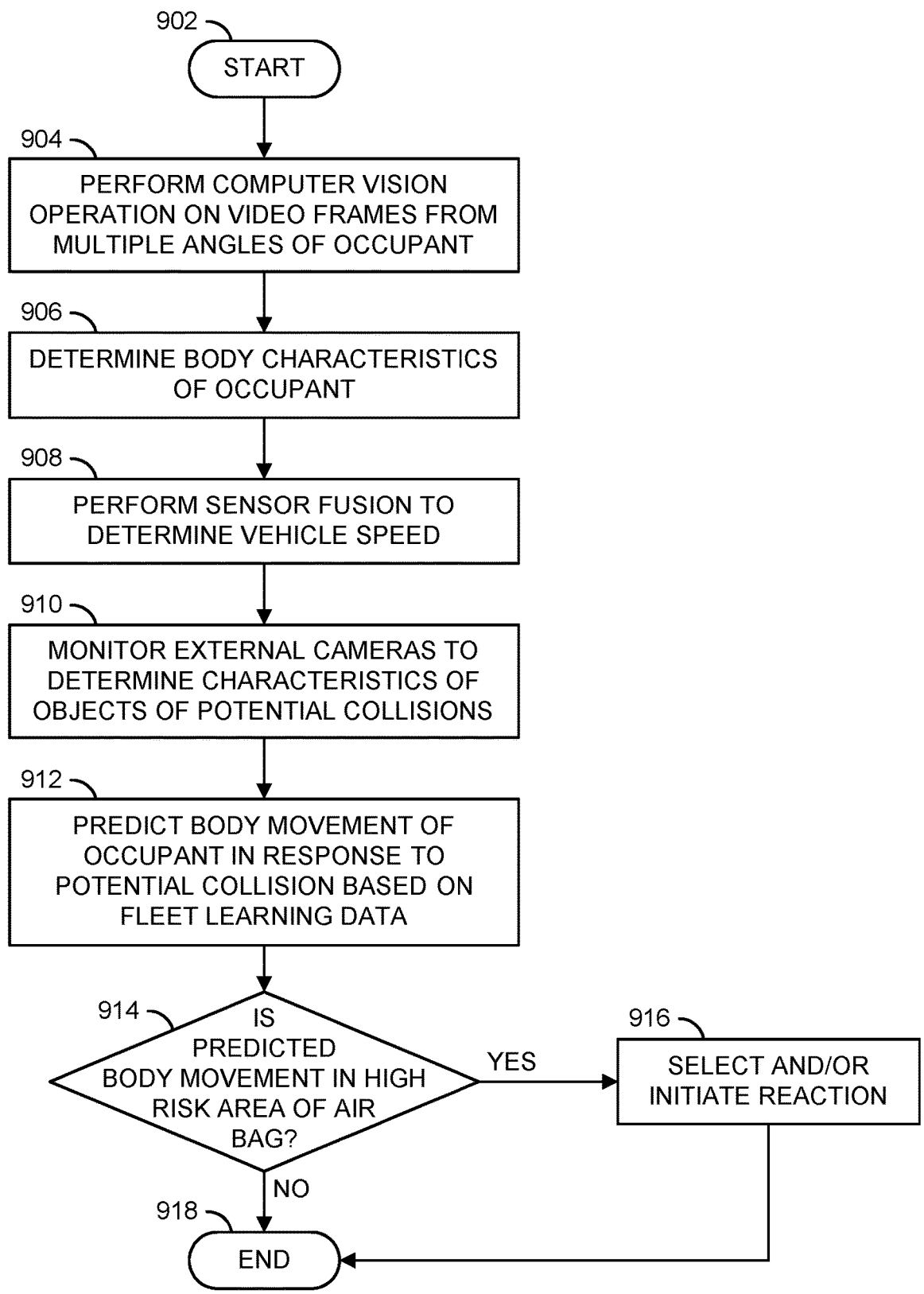
FIG. 16 is a flow diagram illustrating predicting body movement of an occupant in response to fleet learning.

Referring to FIG. 16, a method (or process) 900 is shown. The method 900 may predict body movement of an occupant in response to fleet learning. The method 900 generally comprises a step (or state) 902, a step (or state) 904, a step (or state) 906, a step (or state) 908, a step (or state) 910, a step (or state) 912, a decision step (or state) 914, a step (or state) 916, and a step (or state) 918.

The step 902 may start the method 900. In the step 904, the processors 106a-106n may perform the computer vision operations on the video frames received from multiple angles captured by the capture devices 102a-102n. Next, in the step 906, the processors 106a-106n may determine the body characteristics of the occupants 452a-452n (e.g., body size, body proportions, current body orientation, location of the body within the vehicle 50, the restraints used on the body, etc.). In the step 908, the sensor fusion module 152 may perform sensor fusion operations to combine information from the various sensors 114 of the vehicle 50 (e.g., accelerometers, speed sensors, assisted braking systems, etc.) to determine the current speed and/or trajectory. Next, the method 900 may move to the step 910.

In the step 910, the processors 106a-106n may monitor (e.g., perform the computer vision operations on) the video data received from the capture devices 102a-102n providing a view of the exterior of the vehicle 50. Next, in the step 912, the processors 106a-106n may predict the body movements of the occupants 452a-452n in response to a potential collision based on the fleet learning data (e.g., data about the body movements of crash test dummies generated in response to performing computer vision operations on multiple vehicle collisions in a crash testing facility). Next, the method 900 may move to the decision step 914.

In the decision step 914, the processors 106a-106n may determine whether the predicted body movement is in a high risk area of the deployment of the air bag 556. For example, if the body of a child is predicted to suddenly move forwards in response to a collision, the air bag may deploy and cause head and/or neck injuries to the child. If not, the method 900 may move to the step 918. If the predicted body movements may move one of the occupants 452a-452n into a high risk area, the method 900 may move to the step 916. In the step 916, the decision module 158 may select and/or initiate the reaction (e.g., provide a warning, modify the deployment settings for the air bag 556, etc.). Next, the method 900 may move to the step 918. The step 918 may end the method 900.

The functions performed by the diagrams of FIGS. 1-16 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data corresponding to an interior view of a vehicle; and
a processor configured to (i) generate video frames from said pixel data, (ii) perform computer vision operations to detect objects in said video frames, (iii) detect (a) occupants of said vehicle and (b) seats of said vehicle based on said objects detected in said video frames, (iv) determine an age of said occupants based on characteristics of said occupants and (v) select a reaction when said age of one of said occupants is below a threshold for a respective one of said and select an alternate reaction when said age of one of said occupants is above said threshold for said respective one of said seats, wherein (a) said threshold is based on a location of said respective one of said seats within said vehicle, (b) said characteristics are determined by performing said computer vision operations on each of said occupants, (c) said computer vision operations detect said objects by performing feature extraction based on neural network weight values for each of a plurality of visual features that are associated with said objects extracted from said video frames and (d) said neural network weight values are determined in response to an analysis of training data by said processor prior to said feature extraction.

2. The apparatus according to claim 1, wherein said threshold corresponding to one of said seats of said vehicle is different than a second threshold corresponding to a second of said seats of said vehicle.

3. The apparatus according to claim 1, wherein said location of said respective one of said seats within said vehicle corresponds to a passenger seat.

4. The apparatus according to claim 3, wherein said threshold corresponds to a recommended lower age limit for an air bag corresponding to said passenger seat.

5. The apparatus according to claim 4, wherein said reaction comprises modifying a deployment of said air bag corresponding to said passenger seat.

6. The apparatus according to claim 1, wherein said reaction comprises a warning.

7. The apparatus according to claim 1, wherein said location of said respective one of said seats within said vehicle corresponds to a driver seat.

8. The apparatus according to claim 7, wherein said threshold for said driver seat corresponds to a lower age limit for driving legally.

9. The apparatus according to claim 8, wherein said processor is further configured to determine an age of one of said occupants in a passenger seat when said characteristics of one of said occupants in said driver seat is below said threshold.

10. The apparatus according to claim 7, wherein said reaction comprises sending a message to an owner of said vehicle.

11. The apparatus according to claim 1, wherein said computer vision operations are implemented by a convolutional neural network.

12. The apparatus according to claim 11, wherein (i) said convolutional neural network is trained using fleet learning, (ii) said fleet learning comprises capturing reference images using a capture device in a vehicle production facility, (iii) said reference images comprise an unoccupied interior of a vehicle, (iv) said reference images are used as said training data for said convolutional neural network and (v) said training data comprises said reference images from many different vehicles.

13. The apparatus according to claim 11, wherein (i) said convolutional neural network is trained using fleet learning, (ii) said fleet learning comprises capturing reference images using a capture device in a vehicle crash test facility, (iii) said reference images comprise body movements of crash test dummies during test crashes, (iv) said reference images are used as said training data for said convolutional neural network and (v) said training data comprises said reference images from many different vehicles.

14. The apparatus according to claim 13, wherein said body movements of said reference images are used to predict body movements of said occupants in response to potential collisions.

15. The apparatus according to claim 14, wherein (i) said apparatus further comprises a second capture device configured to generate said pixel data to enable said processor to generate a second plurality of video frames corresponding to an exterior view of said vehicle and (ii) said potential collisions are determined by detecting objects based on said second plurality of video frames.

16. The apparatus according to claim 1, wherein said processor has a plurality of co-processors.

17. The apparatus according to claim 1, wherein (i) said apparatus comprises a second capture device configured to implement a stereo camera pair with a first capture device and (ii) said computer vision operations comprise performing stereo vision to determine depth information based on said video frames generated in response to said pixel data captured by said stereo camera pair.

18. The apparatus according to claim 1, wherein said reaction selected by said processor is implemented autonomously by said vehicle.

19. The apparatus according to claim 1, wherein said computer vision operations are further performed by (i) applying a feature detection window to each of a plurality of layers extracted from said video frames and (ii) a convolution operation using matrix multiplication of said plurality of layers defined by said feature detection window.

20. An apparatus comprising:
an interface configured to generate pixel data corresponding to an interior view of a vehicle; and
a processor configured to (i) generate video frames from said pixel data, (ii) perform computer vision operations to detect objects in said video frames, (iii) detect (a) occupants of said vehicle and (b) seats of said vehicle based on said objects detected in said video frames, (iv) determine an age of said occupants based on characteristics of said occupants and (v) select a reaction when said age of one of said occupants is below a threshold for a respective one of said seats and select an alternate reaction when said age of one of said occupants is above said threshold for said respective one of said seats, wherein (a) said threshold is based on a location of said respective one of said seats within said vehicle, (b) said characteristics are determined by performing said computer vision operations on each of said occupants and (c) said computer vision operations are further performed by (i) applying a feature detection window to each of a plurality of layers extracted from said video frames and (ii) a convolution operation using matrix multiplication of said plurality of layers defined by said feature detection window.

\* \* \* \* \*